US012719167B2

(12) United States Patent
Liu et al.

(10) Patent No.: US 12,719,167 B2
(45) Date of Patent: Aug. 25, 2026

(54) DUAL BAND PRINTED F-ANTENNA USING A TRAP WITH SMALL BAND SEPARATION

(71) Applicant: Honeywell International Inc., Charlotte, NC (US)

(72) Inventors: Zhong Liu, Doylestown, PA (US); Justin Jose, Muvattupuzha (IN); Amit Kulkarni, Duluth, GA (US)

(73) Assignee: HONEYWELL INTERNATIONAL INC., Charlotted, NC (US)

( * ) Notice: Subject to any disclaimer, the term of this patent is extended or adjusted under 35 U.S.C. 154(b) by 401 days.

(21) Appl. No.: 18/354,434

(22) Filed: Jul. 18, 2023

(65) Prior Publication Data

US 2024/0258694 A1 Aug. 1, 2024

Related U.S. Application Data

(60) Provisional application No. 63/481,724, filed on Jan. 26, 2023.

(51) Int. Cl.
*H01Q 5/321* (2015.01)
*H01Q 9/04* (2006.01)

(52) U.S. Cl.
CPC ........... *H01Q 5/321* (2015.01); *H01Q 9/0421* (2013.01)

(58) Field of Classification Search
CPC ............................ H01Q 5/321; H01Q 9/0421
See application file for complete search history.

(56) References Cited

U.S. PATENT DOCUMENTS

| | | | |
|---|---|---|---|
| 191,512 | A | 6/1877 | Bennett |
| 2,016,004 | A | 10/1935 | Gay |
| 3,974,492 | A | 8/1976 | Girismen |
| 4,009,647 | A | 3/1977 | Howorth |
| 4,046,532 | A | 9/1977 | Nelson |
| 4,341,345 | A | 7/1982 | Hammer et al. |

(Continued)

FOREIGN PATENT DOCUMENTS

| | | | |
|---|---|---|---|
| CA | 2387100 A1 | 11/2003 | |
| CA | 2538139 A1 | 3/2005 | |

(Continued)

OTHER PUBLICATIONS

Awesome Things you can do with a Smart Plug—Blog—carbonTRACK® 1 page, 2021.

(Continued)

*Primary Examiner* — Henry Luong

(74) *Attorney, Agent, or Firm* — Seager, Tufte & Wickhem, LLP

(57) ABSTRACT

A dual band inverted-F antenna includes a first antenna element having a first leg connected to a ground plane and a second leg extending along a length from the first leg to a distal end of the second leg. A second antenna element connects to the second leg at a first connection point that is proximal of the distal end of the second leg, the second antenna element electrically coupled to an antenna signal trace of a PCB. A third antenna element is spaced from the second leg of the first antenna element by a gap and positioned along the length of the second leg proximal of the distal end of the second leg but distal of the first connection point. A trap is operatively coupled across the gap between the second leg of the first antenna element and the third antenna element.

18 Claims, 4 Drawing Sheets

(56) References Cited

U.S. PATENT DOCUMENTS 4,345,162 A 8/1982 Hammer et al.
4,375,637 A 3/1983 Desjardins
4,389,577 A 6/1983 Anderson et al.
4,412,284 A 10/1983 Kerforne et al.
4,523,295 A 6/1985 Zato
4,531,214 A 7/1985 Torres et al.
4,577,977 A 3/1986 Pejsa
4,644,320 A 2/1987 Carr et al.
4,918,615 A 4/1990 Suzuki et al.
4,924,404 A 5/1990 Reinke, Jr.
4,939,922 A 7/1990 Smalley et al.
5,012,406 A 4/1991 Martin
5,315,533 A 5/1994 Stich et al.
5,493,191 A 2/1996 Phoy et al.
5,519,295 A 5/1996 Jatnieks
5,553,094 A 9/1996 Johnson et al.
5,566,084 A 10/1996 Cmar
5,598,349 A 1/1997 Elliason et al.
5,621,256 A 4/1997 Crane et al.
5,727,579 A 3/1998 Chardack
5,745,126 A 4/1998 Jain et al.
5,751,916 A 5/1998 Kon et al.
5,777,598 A 7/1998 Gowda et al.
5,793,125 A 8/1998 Tarng
5,973,662 A 10/1999 Singers et al.
5,990,932 A 11/1999 Bee et al.
6,065,842 A 5/2000 Fink
6,078,970 A 6/2000 Nordstrom et al.
6,139,177 A 10/2000 Venkatraman et al.
6,144,993 A 11/2000 Fukunaga et al.
6,157,943 A 12/2000 Meyer
6,218,995 B1 4/2001 Higgins et al.
6,222,714 B1 4/2001 Hoffman
6,229,429 B1 5/2001 Horon
6,238,337 B1 5/2001 Kambhatla et al.
6,249,100 B1 6/2001 Lange
6,262,496 B1 7/2001 Lamar et al.
6,262,685 B1 7/2001 Welch et al.
6,334,211 B1 12/2001 Kojima et al.
6,353,853 B1 3/2002 Gravlin
6,369,695 B2 4/2002 Horon
6,375,038 B1 4/2002 Daansen et al.
6,429,868 B1 8/2002 Dehner et al.
6,473,084 B1 10/2002 Phillips et al.
6,487,457 B1 11/2002 Hull et al.
6,532,195 B1 3/2003 Head
6,552,525 B2 4/2003 Bessler
6,574,581 B1 6/2003 Bohrer et al.
6,580,950 B1 6/2003 Johnson et al.
6,598,056 B1 7/2003 Hull et al.
6,619,555 B2 9/2003 Rosen
6,704,012 B1 3/2004 Lefave
6,720,874 B2 4/2004 Fufidio et al.
6,741,915 B2 5/2004 Poth
6,796,896 B2 9/2004 Laiti
6,801,199 B1 10/2004 Wallman
6,816,878 B1 11/2004 Zimmers et al.
6,838,978 B2 1/2005 Aizu et al.
6,876,951 B2 4/2005 Skidmore et al.
6,882,278 B2 4/2005 Winings et al.
6,885,185 B1 4/2005 Makinson et al.
6,904,385 B1 6/2005 Budike, Jr.
6,907,387 B1 6/2005 Reardon
6,911,177 B2 6/2005 Deal
6,931,445 B2 8/2005 Davis
6,975,958 B2 12/2005 Bohrer et al.
6,993,403 B1 1/2006 Dadebo et al.
6,993,417 B2 1/2006 Osann, Jr.
7,023,440 B1 4/2006 Havekost et al.
7,031,880 B1 4/2006 Seem et al.
7,058,524 B2 6/2006 Hayes et al.
7,062,722 B1 6/2006 Carlin et al.
7,110,843 B2 9/2006 Pagnano et al.
7,129,900 B2 10/2006 De Angelis
7,139,685 B2 11/2006 Bascle et al.
7,164,972 B2 1/2007 Imhof et al.
7,183,899 B2 2/2007 Behnke
7,196,673 B2 3/2007 Savage et al.
7,200,639 B1 4/2007 Yoshida
7,222,111 B1 5/2007 Budike, Jr.
7,222,800 B2 5/2007 Wruck
7,257,397 B2 8/2007 Shamoon et al.
7,280,030 B1 10/2007 Monaco
7,292,908 B2 11/2007 Borne et al.
7,295,116 B2 11/2007 Kumar et al.
7,302,313 B2 11/2007 Sharp et al.
7,308,323 B2 12/2007 Kruk et al.
7,308,388 B2 12/2007 Beverina et al.
7,313,447 B2 12/2007 Hsiung et al.
7,317,404 B2 1/2008 Cumeralto et al.
7,346,433 B2 3/2008 Budike, Jr.
7,346,467 B2 3/2008 Bohrer et al.
7,356,548 B1 4/2008 Culp et al.
7,372,373 B2 5/2008 Borisov et al.
7,379,782 B1 5/2008 Cocco
7,379,997 B2 5/2008 Ehlers et al.
7,383,148 B2 6/2008 Ahmed
7,392,115 B2 6/2008 Schindler
7,425,924 B2 9/2008 Chung et al.
7,434,742 B2 10/2008 Mueller et al.
7,447,333 B1 11/2008 Masticola et al.
7,453,373 B2 11/2008 Cumeralto et al.
7,466,224 B2 12/2008 Ward et al.
7,496,472 B2 2/2009 Seem
7,512,450 B2 3/2009 Ahmed
7,516,490 B2 4/2009 Riordan et al.
7,527,519 B2 5/2009 Van Dyne
7,548,833 B2 6/2009 Ahmed
7,551,092 B1 6/2009 Henry
7,557,729 B2 7/2009 Hubbard et al.
7,567,844 B2 7/2009 Thomas et al.
7,596,473 B2 9/2009 Hansen et al.
7,603,222 B2 10/2009 Wiseman et al.
7,610,910 B2 11/2009 Ahmed
7,626,507 B2 12/2009 Lacasse
7,664,574 B2 2/2010 Imhof et al.
7,671,814 B2 3/2010 Savage et al.
7,682,464 B2 3/2010 Glenn et al.
7,702,421 B2 4/2010 Sullivan et al.
7,729,882 B2 6/2010 Seem
7,755,494 B2 7/2010 Melker et al.
7,761,310 B2 7/2010 Rodgers
7,774,227 B2 8/2010 Srivastava
7,797,188 B2 9/2010 Srivastava
7,819,136 B1 10/2010 Eddy
7,822,806 B2 10/2010 Frank et al.
7,856,370 B2 12/2010 Katta et al.
7,973,673 B2 7/2011 Payne et al.
7,978,083 B2 7/2011 Melker et al.
7,984,384 B2 7/2011 Chaudhri et al.
7,986,323 B2 7/2011 Kobayashi et al.
7,994,990 B2 8/2011 Stoufer et al.
7,994,994 B2 8/2011 Savage et al.
8,024,666 B2 9/2011 Thompson
8,084,982 B2 12/2011 Grabinger et al.
8,086,047 B2 12/2011 Penke et al.
8,099,178 B2 1/2012 Mairs et al.
8,129,859 B2 3/2012 Pien
8,151,280 B2 4/2012 Sather et al.
8,176,095 B2 5/2012 Murray et al.
8,218,871 B2 7/2012 Angell et al.
8,219,660 B2 7/2012 Mccoy et al.
8,271,941 B2 9/2012 Zhang et al.
8,284,107 B2 10/2012 Borisov et al.
8,294,585 B2 10/2012 Barnhill
8,299,975 B2 10/2012 Savage et al.
8,302,020 B2 10/2012 Louch et al.
8,320,634 B2 11/2012 Deutsch
8,334,422 B2 12/2012 Gutsol et al.
8,344,893 B1 1/2013 Drammeh
8,375,118 B2 2/2013 Hao et al.
8,439,692 B1 5/2013 Oddsen et al.
8,462,060 B2 6/2013 Savage et al.
8,467,734 B2 6/2013 Schubert

(56) References Cited

U.S. PATENT DOCUMENTS

| | | | |
|---|---|---|---|
| 8,473,080 | B2 | 6/2013 | Seem et al. |
| 8,476,590 | B2 | 7/2013 | Stratmann et al. |
| 8,516,016 | B2 | 8/2013 | Park et al. |
| 8,536,998 | B1 | 9/2013 | Siu et al. |
| 8,547,283 | B2 | 10/2013 | Wong et al. |
| 8,558,660 | B2 | 10/2013 | Nix et al. |
| 8,639,527 | B2 | 1/2014 | Rensvold et al. |
| 8,698,637 | B2 | 4/2014 | Raichman |
| 8,774,707 | B2 | 7/2014 | Flammer et al. |
| 8,816,860 | B2 | 8/2014 | Ophardt et al. |
| 8,838,413 | B2 | 9/2014 | Genta |
| 8,869,027 | B2 | 10/2014 | Louch et al. |
| 8,904,497 | B2 | 12/2014 | Hsieh |
| 8,931,337 | B2 | 1/2015 | Renoud et al. |
| 8,936,944 | B2 | 1/2015 | Peltz et al. |
| 8,947,437 | B2 | 2/2015 | Garr et al. |
| 8,950,019 | B2 | 2/2015 | Loberger et al. |
| 8,957,551 | B1 | 2/2015 | Alberth et al. |
| 8,996,188 | B2 | 3/2015 | Frader-Thompson et al. |
| 9,000,926 | B2 | 4/2015 | Hollock et al. |
| 9,002,532 | B2 | 4/2015 | Asmus |
| 9,013,283 | B1 | 4/2015 | Tackaberry |
| 9,030,325 | B2 | 5/2015 | Taneff |
| 9,098,738 | B2 | 8/2015 | Bilet et al. |
| 9,105,071 | B2 | 8/2015 | Fletcher et al. |
| 9,172,245 | B1 | 10/2015 | Lentine et al. |
| 9,175,356 | B2 | 11/2015 | Peltz et al. |
| 9,235,657 | B1 | 1/2016 | Wenzel et al. |
| 9,240,111 | B2 | 1/2016 | Scott et al. |
| 9,256,702 | B2 | 2/2016 | Elbsat et al. |
| 9,280,884 | B1 | 3/2016 | Schultz et al. |
| 9,292,972 | B2 | 3/2016 | Hailemariam et al. |
| 9,311,807 | B2 | 4/2016 | Schultz et al. |
| 9,320,662 | B2 | 4/2016 | Hayes et al. |
| 9,322,566 | B2 | 4/2016 | Wenzel et al. |
| 9,355,069 | B2 | 5/2016 | Elbsat et al. |
| 9,370,600 | B1 | 6/2016 | Dupuis et al. |
| 9,372,482 | B2 | 6/2016 | Rikkola et al. |
| 9,373,242 | B1 | 6/2016 | Conrad et al. |
| 9,396,638 | B2 | 7/2016 | Wildman et al. |
| 9,406,212 | B2 | 8/2016 | De et al. |
| 9,418,535 | B1 | 8/2016 | Felch et al. |
| 9,418,536 | B1 | 8/2016 | Felch et al. |
| 9,436,179 | B1 | 9/2016 | Turney et al. |
| 9,437,993 | B2 | 9/2016 | Stephens |
| 9,441,547 | B2 | 9/2016 | Cai et al. |
| 9,449,219 | B2 | 9/2016 | Bilet et al. |
| 9,477,543 | B2 | 10/2016 | Henley et al. |
| 9,497,832 | B2 | 11/2016 | Verberkt et al. |
| 9,513,364 | B2 | 12/2016 | Hall et al. |
| 9,526,380 | B2 | 12/2016 | Hamilton et al. |
| 9,526,806 | B2 | 12/2016 | Park et al. |
| 9,536,415 | B2 | 1/2017 | De et al. |
| 9,558,648 | B2 | 1/2017 | Douglas |
| 9,568,204 | B2 | 2/2017 | Asmus et al. |
| 9,581,985 | B2 | 2/2017 | Walser et al. |
| 9,591,267 | B2 | 3/2017 | Lipton et al. |
| 9,606,520 | B2 | 3/2017 | Noboa et al. |
| 9,612,601 | B2 | 4/2017 | Beyhaghi et al. |
| 9,613,518 | B2 | 4/2017 | Dunn et al. |
| 9,618,224 | B2 | 4/2017 | Emmons et al. |
| 9,640,059 | B2 | 5/2017 | Hyland |
| 9,672,360 | B2 | 6/2017 | Barkan |
| 9,696,054 | B2 | 7/2017 | Asmus |
| 9,699,871 | B2 | 7/2017 | Karc et al. |
| 9,710,700 | B2 | 7/2017 | Bilet et al. |
| 9,715,242 | B2 | 7/2017 | Pillai et al. |
| 9,721,452 | B2 | 8/2017 | Felch et al. |
| 9,729,945 | B2 | 8/2017 | Schultz et al. |
| 9,766,638 | B2 | 9/2017 | Georgin |
| 9,778,639 | B2 | 10/2017 | Boettcher et al. |
| 9,784,464 | B2 | 10/2017 | Yamamoto et al. |
| 9,798,336 | B2 | 10/2017 | Przybylski |
| 9,826,604 | B2 | 11/2017 | Karc et al. |
| 9,843,743 | B2 | 12/2017 | Lewis et al. |
| 9,852,481 | B1 | 12/2017 | Turney et al. |
| 9,856,634 | B2 | 1/2018 | Rodenbeck et al. |
| 9,872,088 | B2 | 1/2018 | Fadell et al. |
| 9,875,639 | B2 | 1/2018 | Bone et al. |
| 9,911,312 | B2 | 3/2018 | Wildman et al. |
| 9,940,819 | B2 | 4/2018 | Ferniany |
| 9,956,306 | B2 | 5/2018 | Brais et al. |
| 9,982,903 | B1 | 5/2018 | Ridder et al. |
| 9,986,175 | B2 | 5/2018 | Frank et al. |
| 10,007,259 | B2 | 6/2018 | Turney et al. |
| 10,031,494 | B2 | 7/2018 | Holaso |
| 10,044,101 | B1 | 8/2018 | Nair et al. |
| 10,055,114 | B2 | 8/2018 | Shah et al. |
| 10,087,608 | B2 | 10/2018 | Dobizl et al. |
| 10,101,730 | B2 | 10/2018 | Wenzel et al. |
| 10,101,731 | B2 | 10/2018 | Asmus et al. |
| 10,112,727 | B1 | 10/2018 | Cutler |
| 10,175,681 | B2 | 1/2019 | Wenzel et al. |
| 10,222,083 | B2 | 3/2019 | Drees et al. |
| 10,222,767 | B2 | 3/2019 | Holaso et al. |
| 10,223,894 | B2 | 3/2019 | Raichman |
| 10,228,837 | B2 | 3/2019 | Hua et al. |
| 10,235,865 | B2 | 3/2019 | Thyroff |
| 10,251,610 | B2 | 4/2019 | Parthasarathy et al. |
| 10,282,796 | B2 | 5/2019 | Elbsat et al. |
| 10,288,306 | B2 | 5/2019 | Ridder et al. |
| 10,303,843 | B2 | 5/2019 | Bitran et al. |
| 10,317,864 | B2 | 6/2019 | Boettcher et al. |
| 10,332,043 | B2 | 6/2019 | Nair et al. |
| 10,332,382 | B2 | 6/2019 | Thyroff |
| 10,359,748 | B2 | 7/2019 | Elbsat et al. |
| 10,386,820 | B2 | 8/2019 | Wenzel et al. |
| 10,402,767 | B2 | 9/2019 | Noboa et al. |
| 10,514,178 | B2 | 12/2019 | Willmott et al. |
| 10,514,817 | B2 | 12/2019 | Hua et al. |
| 10,520,210 | B2 | 12/2019 | Park et al. |
| 10,544,955 | B2 | 1/2020 | Przybylski |
| 10,558,178 | B2 | 2/2020 | Willmott et al. |
| 10,559,180 | B2 | 2/2020 | Pourmohammad et al. |
| 10,559,181 | B2 | 2/2020 | Pourmohammad et al. |
| 10,565,844 | B2 | 2/2020 | Pourmohammad et al. |
| 10,600,263 | B2 | 3/2020 | Park et al. |
| 10,602,474 | B2 | 3/2020 | Goldstein |
| 10,605,477 | B2 | 3/2020 | Ridder |
| 10,607,147 | B2 | 3/2020 | Raykov et al. |
| 10,615,635 | B1 | 4/2020 | Desantis et al. |
| 10,619,882 | B2 | 4/2020 | Chatterjee et al. |
| 10,627,124 | B2 | 4/2020 | Walser et al. |
| 10,673,380 | B2 | 6/2020 | Wenzel et al. |
| 10,678,227 | B2 | 6/2020 | Przybylski et al. |
| 10,694,610 | B2 | 6/2020 | Karc et al. |
| 10,706,375 | B2 | 7/2020 | Wenzel et al. |
| 10,726,711 | B2 | 7/2020 | Subramanian et al. |
| 10,732,584 | B2 | 8/2020 | Elbsat et al. |
| 10,767,885 | B2 | 9/2020 | Przybylski et al. |
| 10,775,988 | B2 | 9/2020 | Narain et al. |
| 10,796,554 | B2 | 10/2020 | Vincent et al. |
| 10,809,682 | B2 | 10/2020 | Patil et al. |
| 10,809,705 | B2 | 10/2020 | Przybylski |
| 10,824,125 | B2 | 11/2020 | Elbsat et al. |
| 10,854,194 | B2 | 12/2020 | Park et al. |
| 10,871,298 | B2 | 12/2020 | Ridder et al. |
| 10,876,754 | B2 | 12/2020 | Wenzel et al. |
| 10,890,904 | B2 | 1/2021 | Turney et al. |
| 10,900,686 | B2 | 1/2021 | Willmott et al. |
| 10,901,446 | B2 | 1/2021 | Nesler et al. |
| 10,909,240 | B2 | 2/2021 | Eltoft |
| 10,909,642 | B2 | 2/2021 | Elbsat et al. |
| 10,915,094 | B2 | 2/2021 | Wenzel et al. |
| 10,917,740 | B1 | 2/2021 | Scott et al. |
| 10,921,972 | B2 | 2/2021 | Park et al. |
| 10,921,973 | B2 | 2/2021 | Park et al. |
| 10,923,911 | B2 | 2/2021 | Raneri et al. |
| 10,928,790 | B2 | 2/2021 | Mueller et al. |
| 10,948,884 | B2 | 3/2021 | Beaty et al. |
| 10,949,777 | B2 | 3/2021 | Elbsat et al. |
| 10,955,800 | B2 | 3/2021 | Burroughs et al. |
| 10,956,842 | B2 | 3/2021 | Wenzel et al. |
| 10,962,945 | B2 | 3/2021 | Park et al. |

(56) References Cited

U.S. PATENT DOCUMENTS

| | | | |
|---|---|---|---|
| 10,969,135 | B2 | 4/2021 | Willmott et al. |
| 11,002,457 | B2 | 5/2021 | Turney et al. |
| 11,009,252 | B2 | 5/2021 | Turney et al. |
| 11,010,846 | B2 | 5/2021 | Elbsat et al. |
| 11,016,648 | B2 | 5/2021 | Fala et al. |
| 11,016,998 | B2 | 5/2021 | Park et al. |
| 11,022,947 | B2 | 6/2021 | Elbsat et al. |
| 11,024,292 | B2 | 6/2021 | Park et al. |
| 11,036,249 | B2 | 6/2021 | Elbsat |
| 11,038,709 | B2 | 6/2021 | Park et al. |
| 11,042,139 | B2 | 6/2021 | Deshpande et al. |
| 11,042,924 | B2 | 6/2021 | Asmus et al. |
| 11,061,424 | B2 | 7/2021 | Elbsat et al. |
| 11,068,821 | B2 | 7/2021 | Wenzel et al. |
| 11,070,389 | B2 | 7/2021 | Schuster et al. |
| 11,073,976 | B2 | 7/2021 | Park et al. |
| 11,080,289 | B2 | 8/2021 | Park et al. |
| 11,080,426 | B2 | 8/2021 | Park et al. |
| 11,083,072 | B2 | 8/2021 | Karc et al. |
| 11,086,276 | B2 | 8/2021 | Wenzel et al. |
| 11,094,186 | B2 | 8/2021 | Razak |
| 11,108,587 | B2 | 8/2021 | Park et al. |
| 11,113,295 | B2 | 9/2021 | Park et al. |
| 11,119,458 | B2 | 9/2021 | Asp et al. |
| 11,120,012 | B2 | 9/2021 | Park et al. |
| 11,131,473 | B2 | 9/2021 | Risbeck et al. |
| 11,150,617 | B2 | 10/2021 | Ploegert et al. |
| 11,151,983 | B2 | 10/2021 | Park et al. |
| 11,156,996 | B2 | 10/2021 | Schuster et al. |
| 11,158,306 | B2 | 10/2021 | Park et al. |
| 11,182,047 | B2 | 11/2021 | Nayak et al. |
| 11,195,401 | B2 | 12/2021 | Pourmohammad |
| 11,201,395 | B2 | 12/2021 | Carpenter et al. |
| 11,217,087 | B2 | 1/2022 | Pelski |
| 11,226,126 | B2 | 1/2022 | Przybylski et al. |
| 11,243,523 | B2 | 2/2022 | Llopis et al. |
| 11,268,715 | B2 | 3/2022 | Park et al. |
| 11,268,996 | B2 | 3/2022 | Vitullo et al. |
| 11,269,505 | B2 | 3/2022 | Fala et al. |
| 11,272,011 | B1 | 3/2022 | Laughton et al. |
| 11,272,316 | B2 | 3/2022 | Scott et al. |
| 11,275,348 | B2 | 3/2022 | Park et al. |
| 11,275,363 | B2 | 3/2022 | Przybylski et al. |
| 11,281,169 | B2 | 3/2022 | Chatterjee et al. |
| 11,288,754 | B2 | 3/2022 | Elbsat et al. |
| 11,289,853 | B2 | 3/2022 | Stephens |
| 11,314,726 | B2 | 4/2022 | Park et al. |
| 11,314,788 | B2 | 4/2022 | Park et al. |
| 11,334,044 | B2 | 5/2022 | Goyal |
| 11,353,834 | B2 | 6/2022 | Mueller et al. |
| 11,356,292 | B2 | 6/2022 | Ploegert et al. |
| 11,360,451 | B2 | 6/2022 | Pancholi et al. |
| 11,361,123 | B2 | 6/2022 | Ploegert et al. |
| 11,450,969 | B1 | 9/2022 | Hussain |
| 11,569,621 | B2 | 1/2023 | Turner et al. |
| 11,588,245 | B2 | 2/2023 | Wei |
| 11,614,721 | B2 | 3/2023 | Funes |
| 11,888,093 | B2 | 1/2024 | Zhang et al. |
| 11,946,960 | B2 | 4/2024 | Della et al. |
| 12,072,357 | B1 | 8/2024 | Chaboud et al. |
| 2002/0111698 | A1 | 8/2002 | Graziano et al. |
| 2002/0130868 | A1 | 9/2002 | Smith |
| 2002/0175815 | A1 | 11/2002 | Baldwin |
| 2003/0028269 | A1 | 2/2003 | Spriggs et al. |
| 2003/0030637 | A1 | 2/2003 | Grinstein et al. |
| 2003/0046862 | A1 | 3/2003 | Wolf et al. |
| 2003/0071814 | A1 | 4/2003 | Jou et al. |
| 2003/0078677 | A1 | 4/2003 | Hull et al. |
| 2003/0083957 | A1 | 5/2003 | Olefson |
| 2003/0103075 | A1 | 6/2003 | Rosselot |
| 2003/0171851 | A1 | 9/2003 | Brickfield et al. |
| 2003/0179149 | A1 | 9/2003 | Savage et al. |
| 2003/0214400 | A1 | 11/2003 | Mizutani et al. |
| 2003/0233432 | A1 | 12/2003 | Davis et al. |
| 2004/0001009 | A1 | 1/2004 | Winings et al. |

| | | | |
|---|---|---|---|
| 2004/0030531 | A1 | 2/2004 | Miller et al. |
| 2004/0041734 | A1* | 3/2004 | Shiotsu .................... H01Q 9/42 343/702 |
| 2004/0064260 | A1 | 4/2004 | Padmanabhan et al. |
| 2004/0143474 | A1 | 7/2004 | Haeberle et al. |
| 2004/0153437 | A1 | 8/2004 | Buchan |
| 2004/0168115 | A1 | 8/2004 | Bauernschmidt et al. |
| 2004/0196188 | A1 | 10/2004 | Yeh |
| 2004/0233192 | A1 | 11/2004 | Hopper |
| 2004/0260411 | A1 | 12/2004 | Cannon |
| 2005/0007279 | A1 | 1/2005 | Chang |
| 2005/0010460 | A1 | 1/2005 | Mizoguchi et al. |
| 2005/0060107 | A1 | 3/2005 | Rodenberg et al. |
| 2005/0083235 | A1 | 4/2005 | Savage et al. |
| 2005/0110692 | A1 | 5/2005 | Andersson |
| 2005/0119767 | A1 | 6/2005 | Kiwimagi et al. |
| 2005/0143863 | A1 | 6/2005 | Ruane et al. |
| 2005/0190074 | A1 | 9/2005 | Cumeralto et al. |
| 2005/0200554 | A1 | 9/2005 | Chau |
| 2005/0267900 | A1 | 12/2005 | Ahmed et al. |
| 2006/0004841 | A1 | 1/2006 | Heikkonen et al. |
| 2006/0009862 | A1 | 1/2006 | Imhof et al. |
| 2006/0016201 | A1 | 1/2006 | Kopel |
| 2006/0017547 | A1 | 1/2006 | Buckingham et al. |
| 2006/0020177 | A1 | 1/2006 | Seo et al. |
| 2006/0028471 | A1 | 2/2006 | Kincaid et al. |
| 2006/0029256 | A1 | 2/2006 | Miyoshi et al. |
| 2006/0055610 | A1 | 3/2006 | Borisov et al. |
| 2006/0058900 | A1 | 3/2006 | Johanson et al. |
| 2006/0067545 | A1 | 3/2006 | Lewis et al. |
| 2006/0067546 | A1 | 3/2006 | Lewis et al. |
| 2006/0077255 | A1 | 4/2006 | Cheng |
| 2006/0114121 | A1 | 6/2006 | Cumeralto et al. |
| 2006/0161373 | A1 | 7/2006 | Mangrulkar et al. |
| 2006/0184326 | A1 | 8/2006 | McNally et al. |
| 2006/0231568 | A1 | 10/2006 | Lynn et al. |
| 2006/0265664 | A1 | 11/2006 | Simons et al. |
| 2006/0279630 | A1 | 12/2006 | Aggarwal et al. |
| 2006/0284784 | A1 | 12/2006 | Smith et al. |
| 2007/0016955 | A1 | 1/2007 | Goldberg et al. |
| 2007/0055757 | A1 | 3/2007 | Mairs et al. |
| 2007/0055760 | A1 | 3/2007 | McCoy et al. |
| 2007/0061046 | A1 | 3/2007 | Mairs et al. |
| 2007/0063915 | A1 | 3/2007 | Savage et al. |
| 2007/0067062 | A1 | 3/2007 | Mairs et al. |
| 2007/0088534 | A1 | 4/2007 | MacArthur et al. |
| 2007/0090951 | A1 | 4/2007 | Chan et al. |
| 2007/0091091 | A1 | 4/2007 | Gardiner et al. |
| 2007/0101433 | A1 | 5/2007 | Louch et al. |
| 2007/0114295 | A1 | 5/2007 | Jenkins |
| 2007/0118270 | A1 | 5/2007 | Wiseman et al. |
| 2007/0120652 | A1 | 5/2007 | Behnke |
| 2007/0121512 | A1 | 5/2007 | Schibli et al. |
| 2007/0139208 | A1 | 6/2007 | Kates |
| 2007/0188388 | A1 | 8/2007 | Feng et al. |
| 2007/0216682 | A1 | 9/2007 | Navratil et al. |
| 2007/0219645 | A1 | 9/2007 | Thomas et al. |
| 2007/0229366 | A1 | 10/2007 | Kim et al. |
| 2007/0239484 | A1 | 10/2007 | Arond et al. |
| 2007/0268122 | A1 | 11/2007 | Kow et al. |
| 2007/0271006 | A1 | 11/2007 | Golden et al. |
| 2008/0001763 | A1 | 1/2008 | Raja et al. |
| 2008/0009177 | A1 | 1/2008 | Singer et al. |
| 2008/0011864 | A1 | 1/2008 | Tessier et al. |
| 2008/0027885 | A1 | 1/2008 | Van et al. |
| 2008/0036593 | A1 | 2/2008 | Rose-Pehrsson et al. |
| 2008/0062167 | A1 | 3/2008 | Boggs et al. |
| 2008/0099045 | A1 | 5/2008 | Glenn et al. |
| 2008/0103798 | A1 | 5/2008 | Domenikos et al. |
| 2008/0120396 | A1 | 5/2008 | Jayaram et al. |
| 2008/0129536 | A1 | 6/2008 | Randall et al. |
| 2008/0144885 | A1 | 6/2008 | Zucherman et al. |
| 2008/0173629 | A1 | 7/2008 | Deibel et al. |
| 2008/0180330 | A1 | 7/2008 | Wei-Shan et al. |
| 2008/0183424 | A1 | 7/2008 | Seem |
| 2008/0194009 | A1 | 8/2008 | Marentis |
| 2008/0198231 | A1 | 8/2008 | Ozdemir et al. |
| 2008/0209342 | A1 | 8/2008 | Taylor et al. |
| 2008/0222565 | A1 | 9/2008 | Taylor et al. |

(56) References Cited

U.S. PATENT DOCUMENTS

2008/0224862 A1 9/2008 Cirker
2008/0228325 A1 9/2008 Schindler
2008/0238406 A1 10/2008 Banhegyesi
2008/0238711 A1 10/2008 Payne et al.
2008/0242945 A1 10/2008 Gugliotti et al.
2008/0250800 A1 10/2008 Wetzel
2008/0279420 A1 11/2008 Masticola et al.
2008/0280275 A1 11/2008 Collopy
2008/0303658 A1 12/2008 Melker et al.
2008/0306985 A1 12/2008 Murray et al.
2008/0316087 A1 12/2008 Stoufer et al.
2008/0320552 A1 12/2008 Kumar et al.
2009/0001180 A1 1/2009 Siddaramanna et al.
2009/0001181 A1 1/2009 Siddaramanna et al.
2009/0001182 A1 1/2009 Siddaramanna et al.
2009/0015356 A1 1/2009 Chen
2009/0024944 A1 1/2009 Louch et al.
2009/0045804 A1 2/2009 Durling et al.
2009/0065596 A1 3/2009 Seem et al.
2009/0083120 A1 3/2009 Strichman et al.
2009/0096791 A1 4/2009 Abshear et al.
2009/0125337 A1 5/2009 Abri
2009/0125825 A1 5/2009 Rye et al.
2009/0144023 A1 6/2009 Seem
2009/0157744 A1 6/2009 McConnell
2009/0160673 A1 6/2009 Cirker
2009/0195349 A1 8/2009 Frader-Thompson et al.
2009/0224987 A1 9/2009 Maddaleno
2009/0312969 A1 12/2009 Sundaresh et al.
2009/0315409 A1 12/2009 Wheeler et al.
2009/0322782 A1 12/2009 Kimchi et al.
2010/0038218 A1 2/2010 Fisher et al.
2010/0048167 A1 2/2010 Chow et al.
2010/0058248 A1 3/2010 Park
2010/0064001 A1 3/2010 Daily
2010/0070089 A1 3/2010 Harrod et al.
2010/0073162 A1 3/2010 Johnson et al.
2010/0097287 A1 4/2010 Pakosz et al.
2010/0110617 A1 5/2010 Savage et al.
2010/0123421 A1 5/2010 Grabinger et al.
2010/0123560 A1 5/2010 Nix et al.
2010/0134296 A1 6/2010 Hwang
2010/0149053 A1 6/2010 Nakano et al.
2010/0156628 A1 6/2010 Ainsbury et al.
2010/0156630 A1 6/2010 Ainsbury
2010/0188228 A1 7/2010 Hyland
2010/0201514 A1 8/2010 Barna et al.
2010/0223198 A1 9/2010 Noureldin et al.
2010/0249955 A1 9/2010 Sitton
2010/0253538 A1 10/2010 Smith
2010/0280674 A1 11/2010 Jalili
2010/0286937 A1 11/2010 Hedley et al.
2010/0318200 A1 12/2010 Foslien et al.
2010/0324962 A1 12/2010 Nesler et al.
2011/0010654 A1 1/2011 Raymond et al.
2011/0038104 A1 2/2011 Payne et al.
2011/0057799 A1 3/2011 Taneff
2011/0063172 A1 3/2011 Podduturi
2011/0076131 A1 3/2011 Stabley et al.
2011/0077779 A1 3/2011 Fuller et al.
2011/0083094 A1 4/2011 Laycock et al.
2011/0087988 A1 4/2011 Ray et al.
2011/0095608 A1 4/2011 Jonsson et al.
2011/0095949 A1 4/2011 Wong et al.
2011/0112854 A1 5/2011 Koch et al.
2011/0122027 A1 5/2011 Wong et al.
2011/0126111 A1 5/2011 Gill et al.
2011/0149544 A1 6/2011 Khan
2011/0154426 A1 6/2011 Doser et al.
2011/0161124 A1 6/2011 Lappinga et al.
2011/0163925 A1 7/2011 Savage et al.
2011/0169646 A1 7/2011 Raichman
2011/0184563 A1 7/2011 Foslien et al.
2011/0196634 A1 8/2011 Kemp et al.
2011/0202467 A1 8/2011 Hilber et al.
2011/0227806 A1 9/2011 Wong et al.
2011/0242863 A1 10/2011 Park et al.
2011/0260938 A1 10/2011 Xie
2011/0267237 A1 11/2011 Wong et al.
2011/0273298 A1 11/2011 Snodgrass et al.
2011/0291841 A1 12/2011 Hollock et al.
2011/0298301 A1 12/2011 Wong et al.
2011/0302433 A1 12/2011 Liu
2011/0316703 A1 12/2011 Butler et al.
2011/0320054 A1 12/2011 Brzezowski
2012/0001815 A1 1/2012 Wong et al.
2012/0015665 A1 1/2012 Farley et al.
2012/0022700 A1 1/2012 Drees et al.
2012/0039503 A1 2/2012 Chen et al.
2012/0062382 A1 3/2012 Taneff
2012/0075464 A1 3/2012 Derenne et al.
2012/0098710 A1 4/2012 Seal et al.
2012/0109988 A1 5/2012 Li et al.
2012/0112883 A1 5/2012 Wallace et al.
2012/0131217 A1 5/2012 Delorme et al.
2012/0154222 A1 6/2012 Oh et al.
2012/0158185 A1 6/2012 El-Mankabady et al.
2012/0216243 A1 8/2012 Gill et al.
2012/0224057 A1 9/2012 Gill et al.
2012/0259466 A1 10/2012 Ray et al.
2012/0262472 A1 10/2012 Garr et al.
2012/0272146 A1 10/2012 D'Souza et al.
2012/0290261 A1 11/2012 Genta
2012/0291068 A1 11/2012 Khushoo et al.
2012/0303652 A1 11/2012 Tseng
2012/0310418 A1 12/2012 Harrod et al.
2013/0050033 A1 2/2013 Savage et al.
2013/0055132 A1 2/2013 Foslien
2013/0060794 A1 3/2013 Puttabasappa et al.
2013/0082842 A1 4/2013 Balazs et al.
2013/0085620 A1 4/2013 Lu et al.
2013/0086152 A1 4/2013 Hersche et al.
2013/0091631 A1 4/2013 Hayes et al.
2013/0091945 A1 4/2013 Renoud et al.
2013/0099938 A1 4/2013 Borisov et al.
2013/0110295 A1 5/2013 Zheng et al.
2013/0135468 A1 5/2013 Kim et al.
2013/0148248 A1 6/2013 Zhou
2013/0157559 A1 6/2013 Flammer et al.
2013/0164971 A1 6/2013 Chung et al.
2013/0169681 A1 7/2013 Rasane et al.
2013/0178996 A1 7/2013 Li et al.
2013/0184880 A1 7/2013 Mcmahon
2013/0187775 A1 7/2013 Marsden et al.
2013/0204570 A1 8/2013 Mendelson et al.
2013/0229276 A1 9/2013 Hunter
2013/0234534 A1 9/2013 Lin
2013/0268293 A1 10/2013 Knudson et al.
2013/0289774 A1 10/2013 Day et al.
2014/0032157 A1 1/2014 Khiani
2014/0035368 A1 2/2014 Adams
2014/0040998 A1 2/2014 Yi-Chang
2014/0046490 A1 2/2014 Foslien et al.
2014/0046722 A1 2/2014 Rosenbloom et al.
2014/0058539 A1 2/2014 Park
2014/0077821 A1 3/2014 Reed et al.
2014/0088779 A1 3/2014 Chen et al.
2014/0167917 A2 6/2014 Wallace et al.
2014/0180486 A1 6/2014 Newman et al.
2014/0184453 A1 7/2014 Chen et al.
2014/0207291 A1 7/2014 Golden et al.
2014/0265881 A1 9/2014 Karc et al.
2014/0274181 A1 9/2014 Lovegren et al.
2014/0277764 A1 9/2014 Burt
2014/0292518 A1 10/2014 Wildman et al.
2014/0307076 A1 10/2014 Deutsch
2014/0309757 A1 10/2014 Le et al.
2014/0312696 A1 10/2014 Tousignant et al.
2014/0316582 A1 10/2014 Berg-Sonne et al.
2014/0320289 A1 10/2014 Raichman
2014/0342724 A1 11/2014 Hill et al.
2015/0007713 A1 1/2015 Aki
2015/0025329 A1 1/2015 Amarasingham et al.
2015/0032264 A1 1/2015 Emmons et al.

(56) References Cited

U.S. PATENT DOCUMENTS

| | | | |
|---|---|---|---|
| 2015/0035712 | A1 | 2/2015 | Wong et al. |
| 2015/0056909 | A1 | 2/2015 | Chien |
| 2015/0070174 | A1 | 3/2015 | Douglas |
| 2015/0077258 | A1 | 3/2015 | Nelson et al. |
| 2015/0113462 | A1 | 4/2015 | Chen et al. |
| 2015/0123874 | A1 | 5/2015 | Chan et al. |
| 2015/0153918 | A1 | 6/2015 | Chen et al. |
| 2015/0161874 | A1 | 6/2015 | Thyroff et al. |
| 2015/0167995 | A1 | 6/2015 | Fadell et al. |
| 2015/0168949 | A1 | 6/2015 | Hua et al. |
| 2015/0194043 | A1 | 7/2015 | Dunn et al. |
| 2015/0198707 | A1 | 7/2015 | Al-Alusi |
| 2015/0212717 | A1 | 7/2015 | Nair et al. |
| 2015/0213222 | A1 | 7/2015 | Amarasingham et al. |
| 2015/0213379 | A1 | 7/2015 | Nair et al. |
| 2015/0216369 | A1 | 8/2015 | Hamilton et al. |
| 2015/0236417 | A1 | 8/2015 | Iellci |
| 2015/0249337 | A1 | 9/2015 | Raneri et al. |
| 2015/0253748 | A1 | 9/2015 | Brun et al. |
| 2015/0262468 | A1 | 9/2015 | Yang |
| 2015/0281287 | A1 | 10/2015 | Gill et al. |
| 2015/0289125 | A1 | 10/2015 | Van et al. |
| 2015/0323928 | A1 | 11/2015 | Yim et al. |
| 2015/0358874 | A1 | 12/2015 | Ahn et al. |
| 2015/0380932 | A1 | 12/2015 | Karle |
| 2016/0061476 | A1 | 3/2016 | Schultz et al. |
| 2016/0061477 | A1 | 3/2016 | Schultz et al. |
| 2016/0061794 | A1 | 3/2016 | Schultz et al. |
| 2016/0061795 | A1 | 3/2016 | Schultz et al. |
| 2016/0063833 | A1 | 3/2016 | Schultz et al. |
| 2016/0066067 | A1 | 3/2016 | Schultz et al. |
| 2016/0116181 | A1 | 4/2016 | Aultman et al. |
| 2016/0139067 | A1 | 5/2016 | Grace |
| 2016/0195435 | A1 | 7/2016 | Krueger et al. |
| 2016/0197467 | A1 | 7/2016 | Stepp |
| 2016/0223215 | A1 | 8/2016 | Buda et al. |
| 2016/0253897 | A1 | 9/2016 | Wildman et al. |
| 2016/0255516 | A1 | 9/2016 | Hill et al. |
| 2016/0266183 | A1 | 9/2016 | Park |
| 2016/0268742 | A1 | 9/2016 | Seff et al. |
| 2016/0294048 | A1 | 10/2016 | Xu et al. |
| 2016/0294062 | A1 | 10/2016 | Lo et al. |
| 2016/0298864 | A1 | 10/2016 | Ekolind et al. |
| 2016/0306934 | A1 | 10/2016 | Sperry et al. |
| 2016/0314683 | A1 | 10/2016 | Felch et al. |
| 2016/0328948 | A1 | 11/2016 | Ferniany |
| 2016/0335731 | A1 | 11/2016 | Hall |
| 2016/0367925 | A1 | 12/2016 | Blackley |
| 2016/0380392 | A1 | 12/2016 | Justice et al. |
| 2017/0024986 | A1 | 1/2017 | Austin |
| 2017/0152862 | A1 | 6/2017 | Houst et al. |
| 2017/0193792 | A1 | 7/2017 | Bermudez et al. |
| 2017/0207542 | A1 | 7/2017 | Tseng et al. |
| 2017/0256155 | A1 | 9/2017 | Sengstaken, Jr. |
| 2017/0280949 | A1 | 10/2017 | Wildman et al. |
| 2017/0293293 | A1 | 10/2017 | Brownie et al. |
| 2017/0294106 | A1 | 10/2017 | Thyroff |
| 2017/0310109 | A1 | 10/2017 | Bollinger et al. |
| 2017/0365024 | A1 | 12/2017 | Koch et al. |
| 2018/0006492 | A1 | 1/2018 | Kim et al. |
| 2018/0016773 | A1 | 1/2018 | Chandler et al. |
| 2018/0076527 | A1 | 3/2018 | Chen et al. |
| 2018/0151054 | A1 | 5/2018 | Pi |
| 2018/0193501 | A1 | 7/2018 | Ufkes |
| 2018/0218591 | A1 | 8/2018 | Easter |
| 2018/0226797 | A1 | 8/2018 | Galin et al. |
| 2018/0259927 | A1 | 9/2018 | Przybylski et al. |
| 2018/0293038 | A1 | 10/2018 | Meruva et al. |
| 2018/0294570 | A1 | 10/2018 | Stowell |
| 2018/0301014 | A1 | 10/2018 | Worral et al. |
| 2018/0313695 | A1 | 11/2018 | Shim et al. |
| 2018/0364778 | A1 | 12/2018 | Lee |
| 2018/0365957 | A1 | 12/2018 | Wright et al. |
| 2019/0051138 | A1 | 2/2019 | Easter |
| 2019/0067883 | A1 | 2/2019 | Yilmaz et al. |
| 2019/0139395 | A1 | 5/2019 | Rogachev et al. |
| 2019/0157817 | A1 | 5/2019 | Codreanu |
| 2019/0209719 | A1 | 7/2019 | Andersen et al. |
| 2020/0009280 | A1 | 1/2020 | Kupa et al. |
| 2020/0021019 | A1 | 1/2020 | Rajagopalan et al. |
| 2020/0021021 | A1 | 1/2020 | Lin et al. |
| 2020/0074836 | A1 | 3/2020 | Kolavennu et al. |
| 2020/0076067 | A1 | 3/2020 | Mccraven |
| 2020/0090089 | A1 | 3/2020 | Aston et al. |
| 2020/0136374 | A1 | 4/2020 | Hagerman |
| 2020/0146557 | A1 | 5/2020 | Cheung et al. |
| 2020/0168993 | A1 | 5/2020 | Wei |
| 2020/0179544 | A1 | 6/2020 | Ufkes |
| 2020/0200420 | A1 | 6/2020 | Nayak et al. |
| 2020/0208862 | A1 | 7/2020 | Mikulica et al. |
| 2020/0343675 | A1 | 10/2020 | Wolf et al. |
| 2020/0359605 | A1 | 11/2020 | Maher et al. |
| 2021/0010701 | A1 | 1/2021 | Nesler et al. |
| 2021/0011443 | A1 | 1/2021 | Mcnamara et al. |
| 2021/0011444 | A1 | 1/2021 | Risbeck et al. |
| 2021/0018334 | A1 | 1/2021 | Liu et al. |
| 2021/0018884 | A1 | 1/2021 | Kupa et al. |
| 2021/0022194 | A1 | 1/2021 | Taylor et al. |
| 2021/0046205 | A1 | 2/2021 | Copeland et al. |
| 2021/0057205 | A1 | 2/2021 | Riepe et al. |
| 2021/0081845 | A1 | 3/2021 | Choueiter et al. |
| 2021/0157303 | A1 | 5/2021 | Doh et al. |
| 2021/0173046 | A1 | 6/2021 | Regani et al. |
| 2021/0184409 | A1 | 6/2021 | Li et al. |
| 2021/0223769 | A1 | 7/2021 | Khalate et al. |
| 2021/0345065 | A1 | 11/2021 | Fisher et al. |
| 2021/0359413 | A1 | 11/2021 | Sarabandi et al. |
| 2021/0364181 | A1 | 11/2021 | Risbeck et al. |
| 2021/0373519 | A1 | 12/2021 | Risbeck et al. |
| 2022/0011731 | A1 | 1/2022 | Risbeck et al. |
| 2022/0104123 | A1 | 3/2022 | Heeger et al. |
| 2022/0113045 | A1 | 4/2022 | Gamroth et al. |
| 2022/0137580 | A1 | 5/2022 | Burroughs et al. |
| 2022/0149571 | A1 | 5/2022 | Codreanu et al. |
| 2022/0303167 | A1 | 9/2022 | Wang et al. |
| 2022/0352670 | A1 | 11/2022 | East |
| 2023/0039166 | A1 | 2/2023 | Chapel et al. |
| 2023/0261370 | A1 | 8/2023 | Hu et al. |
| 2023/0299506 | A1 | 9/2023 | Park et al. |
| 2023/0318222 | A1 | 10/2023 | Ko |
| 2023/0402842 | A1 | 12/2023 | Macfie et al. |
| 2024/0063658 | A1 | 2/2024 | Williams et al. |
| 2024/0146061 | A1 | 5/2024 | Das et al. |
| 2024/0167720 | A1 | 5/2024 | Luebke |
| 2024/0258693 | A1 | 8/2024 | Liu et al. |
| 2024/0283152 | A1 | 8/2024 | Wei et al. |
| 2024/0283288 | A1 | 8/2024 | Feixas |
| 2024/0313408 | A1 | 9/2024 | Hussain et al. |

FOREIGN PATENT DOCUMENTS

| | | | |
|---|---|---|---|
| CN | 2906952 | Y | 5/2007 |
| CN | 201927858 | U | 8/2011 |
| CN | 201985387 | U | 9/2011 |
| CN | 102891410 | A | 1/2013 |
| CN | 103110410 | A | 5/2013 |
| CN | 103197138 | A | 7/2013 |
| CN | 103259136 | A | 8/2013 |
| CN | 103401103 | A | 11/2013 |
| CN | 203398457 | U | 1/2014 |
| CN | 203707489 | U | 7/2014 |
| CN | 103970977 | A | 8/2014 |
| CN | 104280243 | A | 1/2015 |
| CN | 104601682 | A | 5/2015 |
| CN | 105116848 | A | 12/2015 |
| CN | 105186227 | A | 12/2015 |
| CN | 105527850 | A | 4/2016 |
| CN | 106299896 | A | 1/2017 |
| CN | 106450871 | A | 2/2017 |
| CN | 107168087 | A | 9/2017 |
| CN | 108075324 | A | 5/2018 |
| CN | 207572679 | U | 7/2018 |
| CN | 108961714 | A | 12/2018 |
| CN | 108987919 | A | 12/2018 |

(56) References Cited

FOREIGN PATENT DOCUMENTS

| | | | |
|---|---|---|---|
| CN | 109039840 | A | 12/2018 |
| CN | 109656208 | A | 4/2019 |
| CN | 110009245 | A | 7/2019 |
| CN | 110014930 | A | 7/2019 |
| CN | 110084928 | A | 8/2019 |
| CN | 209448741 | U | 9/2019 |
| CN | 110516788 | A | 11/2019 |
| CN | 210006913 | U | 1/2020 |
| CN | 110768840 | A | 2/2020 |
| CN | 110827457 | A | 2/2020 |
| CN | 110994604 | A | 4/2020 |
| CN | 111649449 | A | 9/2020 |
| CN | 112310753 | A | 2/2021 |
| CN | 213936532 | U | 8/2021 |
| CN | 113381184 | A | 9/2021 |
| CN | 113709839 | A | 11/2021 |
| CN | 114723040 | A | 7/2022 |
| CN | 115296029 | A | 11/2022 |
| CN | 115051151 | B | 4/2024 |
| CN | 113285218 | B | 3/2025 |
| EP | 1669912 | A1 | 6/2006 |
| EP | 2310981 | A1 | 4/2011 |
| EP | 2688144 | A1 | 1/2014 |
| GB | 2478762 | A | 9/2011 |
| GB | 2504967 | A | 2/2014 |
| GB | 2599142 | A | 3/2022 |
| JP | 07-085166 | A | 3/1995 |
| JP | 11-024735 | A | 1/1999 |
| JP | 11-317936 | A | 11/1999 |
| JP | 2001-356813 | A | 12/2001 |
| JP | 2005-242531 | A | 9/2005 |
| JP | 2005-311563 | A | 11/2005 |
| JP | 2012-253865 | A | 12/2012 |
| JP | 2013-004394 | A | 1/2013 |
| JP | 5416066 | B2 | 2/2014 |
| JP | 2018-132318 | A | 8/2018 |
| JP | 7085166 | B2 | 6/2022 |
| KR | 10-2008-0002346 | A | 1/2008 |
| KR | 10-1172747 | B1 | 8/2012 |
| KR | 10-1445367 | B1 | 10/2014 |
| KR | 10-1499081 | B1 | 3/2015 |
| KR | 10-2016-0063666 | A | 6/2016 |
| KR | 10-2017-0113492 | A | 10/2017 |
| KR | 10-2216687 | B1 | 2/2021 |
| KR | 10-2021-0089867 | A | 7/2021 |
| WO | 96/21264 | A2 | 7/1996 |
| WO | 2004/029518 | A1 | 4/2004 |
| WO | 2005/045715 | A2 | 5/2005 |
| WO | 2008/152433 | A1 | 12/2008 |
| WO | 2008/157755 | A1 | 12/2008 |
| WO | 2009/012319 | A2 | 1/2009 |
| WO | 2009/079648 | A1 | 6/2009 |
| WO | 2010/004514 | A1 | 1/2010 |
| WO | 2010/106474 | A1 | 9/2010 |
| WO | 2011/025085 | A1 | 3/2011 |
| WO | 2011/043732 | A1 | 4/2011 |
| WO | 2011/057173 | A2 | 5/2011 |
| WO | 2011/123743 | A1 | 10/2011 |
| WO | 2013/062725 | A1 | 5/2013 |
| WO | 2013/178819 | A1 | 12/2013 |
| WO | 2014/009291 | A1 | 1/2014 |
| WO | 2014/098861 | A1 | 6/2014 |
| WO | 2014/135517 | A1 | 9/2014 |
| WO | 2016113779 | A1 | 7/2016 |
| WO | 2016/123536 | A1 | 8/2016 |
| WO | 2017/057274 | A1 | 4/2017 |
| WO | 2018/222695 | A1 | 12/2018 |
| WO | 2019/046580 | A1 | 3/2019 |
| WO | 2019/141629 | A1 | 7/2019 |
| WO | 2020/016570 | A1 | 1/2020 |
| WO | 2020/024553 | A1 | 2/2020 |
| WO | 2020/093979 | A1 | 5/2020 |
| WO | 2024/087131 | A1 | 5/2024 |
| WO | 2024/087134 | A1 | 5/2024 |

OTHER PUBLICATIONS

Ball, Green Goal of 'Carbon Neutrality' Hits Limit, TheWall Street Journal, 7 pages, Dec. 30, 2008.
Bell et al., "Early Event Detection-Results from a Prototype Implementation," AICHE Spring National Meeting, 15 pages, Apr. 2005.
Bobker et al., "Operational Effectiveness in Use of BAS," Proceedings of the 13th International Conference for Enhanced Building Operations, Oct. 8, 2013.
Bocicor et al. "Wireless Sensor Network based System for the Prevention of Hospital Acquired Infections", arxiv.org, Cornell University Ithaca, NY 14853, May 2, 2017, XP080947042, (Abstract).
Bouktif et al., "Optimal Learning LSTM Model for Electric Loan Forecasting Using Feature Selection and Genetic Algorithm: Comparison with Machine learning Approaches," Energies, vol. 11, pp. 1-20. Published Jun. 2018.
Cadgraphics, "The Cadgraphics User's Guide," 198 pages, 2003.
Carrier Comfort Network CCN Web, "Web Browser User Interface to the Carrier Comfort Network," 2 pages, 2002.
Carrier Comfort Network CCN Web, Overview and Configuration Manual, 134 pages, Apr. 2006.
Carrier Comfort Network CCN Web, Product Data, 2 pages, Apr. 2006.
Carrier, "i-Vu Powerful and Intuitive Front End for Building Control," 2 pages, Aug. 2005.
Carrier, "i-Vu Web-Based Integrated Control System," 3 pages, 2005.
Carrier, Demo Screen Shots, 15 pages, prior to Aug. 27, 2007.
Carrier, i-Vu CCN 4.0, Owner's Guide, 20 pages, Jul. 2007.
Carrier, i-Vu CCN, 7 pages, 2007.
Carter, "Industrial Energy Management Dashboards Require a Toolkit," Cross Automation, 11 pages, Nov. 4, 2013.
Castangia et al., "Detection of Anamolies in Household Appliances from Disaggregated Load Consumption," International Conference on Smart Energy Systems and Technologies, 2021. 6 pages. Downloaded on Oct. 30, 2023 from IEEE Xplore.
Castelo, "A 30 Interactive Environment for Automated Building Control," Elsevier, Nov. 8, 2012.
Castle, "7 Software Platforms that Make Building Energy Management Easy," http://greentechadvocates.com/2012/11/28/7-software-platforms-that-make-building-energy-managment-easy/, Nov. 28, 2012.
Cericola, The 4 Best Plug-In Smart Outlets of 2023, Reviews by New York Times Wirecutter, 5 pages, Updated Oct. 25, 2023. Accessed Oct. 26, 2023.
Cericola, The Best Plug-In Smart Outlet, Reviews by New York Times Wirecutter, 1 page, 2022.
Chan, "Rank Revealing QR Factorizations," Linear Algebra and It's Applications, vol. 88-89, p. 67-82, Apr. 1987.
Cimetrics BACnet Explorer (B5001), 9 pages, 2023. Accessed Oct. 26, 2023.
Circon, "i-Browse Web-Based Monitoring and Control for Facility Management," 2 pages, prior to Aug. 27, 2007.
Controller BACnet/IP (750-831) Wago India, 5 pages, 2023. Accessed Oct. 26, 2023.
Copper Cube Setup Guide, Copper Tree Analytics, Delta Controls Inc., Document Edition 3.0, 20 pages, Feb. 2020.
Published Australian Application 2009904740, 28 pages, Application Filed on Sep. 29, 2009.
Search Report and Written Opinion from related International PCT Application No. PCT/US2018/025189 dated Jul. 17, 2018 (12 pages).
U.S. Appl. No. 14,109,496, filed Dec. 17, 2013.
U.S. Appl. No. 14/169,071, filed Jan. 30, 2014.
U.S. Appl. No. 14/169,083, filed Jan. 30, 2014.
U.S. Appl. No. 14/461,188, filed Aug. 15, 2014.
U.S. Appl. No. 14/482,607, filed Sep. 10, 2014.
Dasgupta, "Your voice may be able to tell you if you have Covid," Hindustan Times, 4 pages, Apr. 16, 2020.
Donnelly, "Building Energy Management: Using Data as a Tool", http://www.buildingefficiencyinitiative.org/sites/default/files/legacy/InstituteBE/media/Library/Resources/Existi ng-Buil ding-Retrofits/Using-Buil ding-Data-as-a-Tool.pdf, Oct. 2012, 9 pages.
e-homecontrols.com, "e-Home Controls Website," link to actual

(56) References Cited

OTHER PUBLICATIONS website no longer works, 1 page, prior to Dec. 19, 2013.
Echelon, "Energy Control Solutions with the i.Lon SmartServer," 4 pages, 2007.
Echelon, "i.Lon 100e3 Internet Server Models 72101R-300, 72101R-308, 72102R-300, 72103-R300 . . . " 5 pages, copyright 2002-2007.
Echelon, "i.Lon 100e3 Internet Server New Features," 15 pages, Sep. 2006.
Echelon, "i.Lon SmartServer," 5 pages, 2007.
Ecobee, "Meet the Ecobee Smart Thermostat," Sales Sheet, 2 pages, prior to Jun. 16, 2009.
Ecobee, Screenshot of Ecobee Web Site Window, Captured prior to Jun. 16, 2009.
Ecobee, Smart Installation Manual, pp. 1-26, 2009.
Ecobee, Smart Thermostat User Manual, pp. 1-32, 2009.
EMbox Timer Switch Electrical on off-Automatic Power Cut Off Smart Plug, Amazon Product Sheet, 1 page, 2022.
Energy Management Savings Tips for Hotels, Hotel Management Newsletter, 7 pages, 2022. Accessed Oct. 26, 2022.
EnteliWEB catalog sheet, Delta Controls, Inc., 2012.
EnteliWEB catalog sheet, Delta Controls., 2010.
EnteliWEB product from Delta Controls, web pages retrieved on May 9, 2013 from http://deltacontrols.com/products/facilities-management/supervisory-software et seq. by the Internet Archive at web.archive.org.
EP Extended European Search Report, EP Application No. 23201990.1, European Patent Office, Apr. 26, 2024 (13 pages).
Trane, "System Programming, Tracer Summit Version 14, BMTW-SVP01 D-EN," 623 pages, 2002.
U.S. Appl. No. 18/750,560, filed Jun. 21, 2024.
Wago I/O System Series 750/753, Decentralized Automation Technology, 66 pages, Wago Techdocs, System Manual Version 3.3.3, 2023.
Wattsense Hub, Technical Datasheet,Intuitive IoT Gateway, 6 pages, 247able.com, V1.3, 2021.
Wu et al., "A Web 2.0 Based Scientific Application Framework," 7 pages, prior to Jul. 24, 2014.
www.geappliances.com/home-energy-manager/about-energy-monitors.htm, "Energy Monitor, Home Energy Monitors, GE Nucleus," 2 pages, printed Jan. 15, 2013.
www.luciddesigngroup.com/network/apps.php#homepage, "Lucid Design Group—Building Dashboard Network—Apps," 7 pages, Jan. 15, 2013.
Xiamoi Smart Plug 2, (Wi-Fi), Overview, 1 page, 2023.
Zito, "What is Tridium Part 1," http://blog.buildingautomationmonthly.com/what-is-tridium/, May 12, 2013.
Zito, "What is Tridium Part 2," http://blog.buildingautomationmonthly.com/tridium-part-2/, Sep. 10, 2013.
Extended European Search Report, EP Application No. 24150166.7, European Patent Office, Jun. 7, 2024 (9 pages).
Mathew, "Action-Oriented Benchmarking, Using CEUS Date to Identify and Prioritize Efficiency Opportunities in California Commercial Buildings," 26 pages, Jun. 2007.
Morrison et al., "The Early Event Detection Toolkit," Honeywell Process Solutions, 14 pages, Jan. 2006.
Narang, "Webarc: Control and Monitoring of Building Systems Over the Web," 53 pages, May 1999.
Oey et al., "Evaluation of Isolation Compliance Using Real Time Video in Critical Care," North Shore University Hospital, 1 page, Oct. 9, 2015.
Olken et al., "Object Lessons Learned from a Distributed System for Remote Building Monitoring and Operation," ACM SIGPLAN Notices, vol. 33, No. 10, pp. 284-295, Oct. 1998.
Open Blue Companion Desktop User Guide, Johnson Controls, 18 pages, 2022.
Open Blue Digital Twin:Designed for Buildings. Infused with AI, Johnson Controls, 17 pages, 2022. Accessed Aug. 29, 2022.
Open Blue Enterprise Manager User Guide, Johnson Controls, 108 pages, Release 4.1.3, 2022, Accessed Aug. 29, 2022.
Open Blue Enterprise Manager User Guide, Johnson Controls, Release 3.1, 72 pages, Jan. 28, 2021.
Open Blue Enterprise Manager User Guide, Johnson Controls, Release 4.0, 78pages, Nov. 29, 2021.
Open Blue Enterprise Manager, Optimize Building Portfolio Performance with Advanced Data Analystics and AI, Johnson Controls, 20 pages, Accessed Aug. 29, 2022.
Open Blue Location Manager User Guide, Johnson Controls, Release 2.4.7, 28 pages, Jul. 20, 2022.
Open Blue Platform, Make Smarter, Faster, More Data-Driven Decisions, Johnson Controls, 15 pages, 2022. Accessed Aug. 29, 2022.
Open Blue, Now, Spaces have Memory and Identity, Johnson Controls, 20 pages, 2022. Accessed Feb. 10, 2022.
Panduit Corp., "Enable a Building Automation with Panduit Enterprise Solutions," 4 pages, Nov. 2012.
Patents Act 1977: Combined Search and Examination Report under Sections 17 and 18(3), GB Application No. GB2316283.7, GB Intellectual Property Office, Apr. 17, 2024 (9 pages).
Patents Act 1977: Combined Search and Examination Report under Sections 17 and 18(3), UK Intellectual Property Office, Application No. GB2314939.6, Oct. 28, 2024 (7 pages).
Patents Act 1977: Search Report under Section 17, Application No. GB2316189.6, GB Intellectual Property Office, Apr. 2, 2024 (4 pages).
Pattnayak et al., "Antenna Design and RF Layout Guidelines," Cypress Semiconductor Corporation, Document No. 001-91445 Rev. H, pp. 1-60, 2023, www.cypress.com.
Peshal B. Nayak et al., "A Novel Compact Dual-Band Antenna Design for WLAN Applications," arxiv.org, Cornell University Library, 201 Olin Library Cornell University, Ithaca, NY 14853, May 12, 2021, XP081973069 (6 pages).
Plug Loads—GSA Sustainable Facilities Tool, US General Services Administration, 1 page, 2023.
Power Meter with Antenna 2118284-1 Rev, 1 pages, Jun. 2018.
Preuveneers et al., "Intelligent Widgets for Intuitive Interaction and Coordination in Smart Home Environments," IEEE Eighth International Conference on Intelligent Environments, pp. 157-164, 2012.
Proliphix, Inc., "Proliphix IP Devices: HTTP API," 28 pages, Jan. 23, 2006.
Proliphix, Inc., Remote Management User Guide, 12 pages, prior to Aug. 27, 2007.
Punn et al., "Monitoring COVID-19 social distancing with person detection and tracking via fine-tuned Yolo v3 and Deepsort techniques," 10 pages, May 6, 2020.
Quirk, "A Brief History of BIM," Arch Daily, Dec. 7, 2012.
Richard Rogan et al., "Smart and Final Food Stores: A Case Study in Web Based Energy Information and Collection," Web Based Energy Information and Control Systems: Case Studies and Application, Chapter 6, p. 59-64, 2005.
Risbeck et al; "Modeling and Multiobjective Optimization of Indoor Airborne Disease Transmission Risk and Associated Energy Consumption for Building HVAC Systems," Energy and Buildings, vol. 253, 24 pages, 2021.
RP-C Pro, Product Datasheet, 1 page, Schneider Electric, 2022.
Saltzman, "Sky-High Electric Bill? Save with Smart Power Outlets, Power strips, LED Bulbs, Thermostats," USA Today, 1 page, 2022.
Samad et al., "Leveraging the Web: A Universal Framework for Building Automation," Proceedings of the 2007 American Control Conference, Jul. 11, 2007.
Sharp, "Actius AL3DU 3D LC Display High Performance 3D Visualization," 2 pages, prior to Mar. 17, 2006.
Shhedi et al., "Traditional and ICT Solutions for Preventing the Hospital Acquired Infection", 2015 20th International Conference on Control Systems and Computer Science, IEEE, May 27, 2015, pp. 867-873, XP033188038.
Silva et al., "Cough localization for the detection of respiratory diseases in pig houses," ScienceDirect, 7 pages, May 28, 2008.
Sinha et al., "9 Key attributes of energy dashboards and analytics tools," https://www.greenbiz.com/blog/2013/08/28/9-key-attributes-energy-dashboards-and=analytics-tools, Aug. 28, 2013.

(56) References Cited

OTHER PUBLICATIONS

Sinha et al; "Balance Infection Risk, Sustainability and Comfort with Open Blue," Johnson Controls, 2 pages, 2021.
Sinopoli, "Dashboards for Buildings," http://www/automatedbuildings.com/news/dec10/articles/sinopoli/101119034404sinopoli.html, Dec. 2010.
Sinopoli, "Modeling Building Automation and Control Systems," http://www.automatedbuildings.com/news/jun13/articles/sinopoli/130521122303sinopoli.html, Jun. 2013.
Siretta, Echo-14 5G/4G/Dual Band Wi-Fi Compact PCB Embedded Antenna Datasheet, Rev 3.2, 20 pages, 2024.
So et al., "Building Automation on the Information Superhighway," ASHRAE (American Society of Heating Refrigerating, and Air Conditioning) Transactions, vol. 104, Part 2, pp. 176-191, 1998.
So et al., "Building Automation Systems on the Internet," Facilities vol. 15, No. 5/6, pp. 125-133, May/Jun. 1997.
Spacelogic RP-C Pro, Product Datasheet, 30 pages, Product Version 2022, Oct. 9, 2023.
Sundramoorthy et al., "Dehems: A User-Driven Domestic Energy Monitoring System," Conference Paper, IEEE, 9 pages, Jan. 2011.
Talon, "Raptor Controller," 6 pages, Oct. 2003.
Talon, "Workstation Software," 4 pages, Nov. 2002.
The 4 Best Practices to Conserve Energy in Schools—Blog—Entrak Hong Kong Limited, 1 page, 2022.
The Hub Technical Datasheet, Intuitive IoT Gateway, V1.4, 5 pages, 2022.
Trane (Registered), "Creating Input/Output Object", BMTW-SVP01D-EN, pp. 226-421. (date not available).
Trane (Registered), "Using the Graphics Editor", pp. 422-601. (date not available).
Lamensdorf et al., "Dual-Band Quadrifiliar Helix Antenna," IEEE, p. 488-491, 2001. Accessed May 31, 2022.
Lui et al., "Compact Dual-Frequency PIFA Designs Using LC Resonators," IEEE Transactions on Antennas and Propagation, vol. 49, No. 7, Jul. 2001.
Rennings et al., "A Compact Single/Dual-Band Printed Inverted-F Type Antenna Structure," 8 pages, 2004.
Reuster et al., "A High—Efficiency Broadband HF Wire-Antenna System," IEEE Antennas and Propagation Magazine, vol. 42, No. 4, pp. 53-61, Aug. 2000. Accessed on May 31, 2022.
Wikipedia, Inverted-F Antenna, pp. 1-6, 2023. Accessed Jan. 25, 2023.
Extended European Search Report, EP application No. 20151295.1, pp. 13, May 26, 2020.
Extended European Search Report, EP Application No. 24151591.5, European Patent Office, Jun. 4, 2024 (8 pages).
Fully Web-Based BACnet Compliant Building Management System, WEBfactory, 1 page, 2023.
Ganguty, "Gurugram-based startup Staqu has modified AI-powered Jarvis to battle coronavirus," Yourstory, 7 pages, Mar. 31, 2020.
GB Search Report, GB Application No. GB2101308.1, dated Jul. 23, 2021 (7 pages).
Hasan et al., "Dual Band Metamaterial Antenna for LTE/Bluetooth/WiMax System," Scientific Reports, vol. 8, Article No. 1240, 17 pages, Published Online Jan. 19, 2018.
Hiliwi Technology, HLW8110/HLW8112 Datasheet, Rev 1.01, 74 pages, Updated Schematic, Nov. 20, 2020.
HLW Technology (Registered), HLW8110/HLW8112 DataSheet, Rev 1.01, 74 pages. (date not available).
Honeywell News Release, "Honeywell's New Sysnet Facilities Integration System for Boiler Plant and Combustion Safety Processes," 4 pages, Dec. 15, 1995.
Honeywell, "Excel Building Supervisor-Integrated R7044 and FS90 Ver. 2.0," Operator Manual, 70 pages, Apr. 1995.
Honeywell, "Product Guide 2004," XP-002472407, 127 pages, 2004.
Honeywell, "Introduction of the S7350A Honeywell WebPAD Information Appliance," Home and Building Control Bulletin, 2 pages, Aug. 29, 2000; Picture of WebPad Device with touch screen, 1 Page; and screen shots of WebPad Device, 4 pages.
Honeywell, Excel 15B W7760B Building Manager Release 2.02.00, Installation Instructions, 28 pages, Dec. 2004.
Honeywell, The RapidZone Solution, Excel 5000 Open System, Application Guide, 52 pages, Jan. 2004.
How Pert's Smart Home Automation Products can help you Save Energy & Money, Pert™ 25 pages, Dec. 5, 2021. Accessed Oct. 26, 2022.
http://pueblo.lbl.gov/~olken . . . , "Remote Building Monitoring and Operations Home Page," 5 pages, prior to Aug. 27, 2007.
http://www.ccbac.com, "C&C (/)—Omniboard," 5 pages, Dec. 19, 2013.
http://www.commercial.carrier.com/commercial/hvac/productdescription . . . , "Carrier: 33CSCCNWEB-01 CCN Web Internet Connection to the Carrier Comfort Network," 1 page, printed Mar. 11, 2008.
http://www.commercial.carrier.com/commercial/hvac/productdescription . . . , "Carrier: i-Vu CCN," 1 page, printed Mar. 11, 2008.
http://www.domcontroller.com/en/, "DomController Home Automation Software—Control Anything from Anywhere," 11 pages, printed Jan. 6, 2015.
http://www.ecobee.com/productspecifications, "Programmable Thermostats and Other Green Living Products—Specifications," 2 pages, 2009.
http://www.lightstat.com/products/istat.asp, Lightstat Incorporated, "Internet Programmable Communicating Thermostats," 1 page, printed Mar. 13, 2007.
http://www.novar.com/ems-bas/opus-building-automation-system, "Novar OPUS BAS," 1 page, prior to Feb. 13, 2013.
http://www.sharpsystems.com/products/pc_notebooks/actius/rd/3d/, "Actius RD3D Desktop Replacement Notebook with Industry-Breakthrough 3D Screen," Sharp, 1 page, printed Jun. 16, 2005.
http://www2.sims.berkeley.edu/courses/is213/s06/projects/lightson;final.html, "Lights on a Wireless Lighting Control System," 11 pages, printed Mar. 22, 2007.
I-stat, Demo Screen Shots, 9 pages, printed Mar. 13, 2007.
I-stat, The Internet Programmable Thermostat, 2 pages, prior to Aug. 27, 2007.
I.Lon 100e3 Internet Server, 1 page, prior to Aug. 27, 2007.
I.Lon, SmartServer, 2 pages, prior to Aug. 27, 2007.
I4BACnet the Web-based Management Control System for your Building Management System, 5 pages, Ewon® by HMS Networks, 2023. Accessed Oct. 26, 2023.
Infineon Technologies, "Predictive Maintenance and Condition Monitoring," 17 pages, Downloaded Sep. 14, 2023.
Instituto Superior Tecnico, "A 3D Interactive Environment for Automated Building Control," Master's Dissertation, 120 pages, Nov. 2012.
International Search Report and Written Opinion received for PCT Patent Application No. PCT/CN2022/128109, mailed on Jun. 23, 2023, 6 pages.
International Search Report and Written Opinion received for PCT Patent Application No. PCT/CN2022/128112, mailed on Dec. 29, 2022, 6 pages.
International Search Report and Written Opinion received for PCT Patent Application No. PCT/CN2022/128113, mailed on Jul. 5, 2023, 6 pages.
International Search Report and Written Opinion received for PCT Patent Application No. PCT/CN2022/128115, mailed on Jun. 23, 2023, 9 pages.
Jeffrey Ball, "Green Goal of 'Carbon Neutrality' Hits Limit," TheWall Street Journal, 7 pages, Dec. 30, 2008.
Johnson Controls and Microsoft Announce Global Collaboration, Launch Integration between Open Blue Digital Twin and Azure Digital Twins, 7 pages, 2022. Accessed Aug. 29, 2022.
Johnson Controls Develops Industry-first AI Driven Digital Solution to Manage Clean Air, Energy, Sustainability, Comfort and Cost in Buildings, 7 pages, 2022. Accessed Aug. 29, 2022.
Johnson Controls, Network Integration Engine (NIE) 3 pages, Nov. 9, 2007.
Johnson Controls, Network Integration Engine (NIE), Product Bulletin, pp. 1-11, Jan. 30, 2008.
Johnson Controls, Verasys System European User's Guide, 30 pages, Release 4.0, Oct. 30, 2020.

(56) References Cited

OTHER PUBLICATIONS

Johnson Controls, Verasys System European User's Guide, 38 pages, 2023. Accessed Oct. 26, 2023.
Kim et al., "Applicance Classification by Power Signal Analysis Based on Multi-Feature Combination Multi-Layer LSTM," Energies, vol. 12, pp. 1-24. Published Jul. 21, 2019.
Kourti, "Process Analysis and Abnormal Situation Detection: From Theory to Practice," IEEE Control Systems Magazine, p. 10-25, Oct. 2002.
Kufakunesu et al., A Survey on Adaptive Data Rate Optimization in LoRaWAN: Recent Solutions and Major Challenges, Sensors, vol. 20, No. 5044, 25 pages, Published Sep. 5, 2020.
Lacey, "The Top 10 Software Vendors Connecting Smart Buildings to the Smart Grid," http://www.greentechmedia.com/articles/read/the-top-10-companies-in-enterprise-smart-grid, Jul. 18, 2013.
Legrand Brand Photos, Prior Art Product, 1 page, Photos dated on or before Nov. 30, 2023.
Li et al., "How Agile is the Adaptive Data Rate Mechanism of LoRaWAN?" IEEE, 6 pages, 2018. Downloaded Aug. 28, 2018.
Lucid Design Group, Inc., "Building Dashboard," 2 pages, Printed May 30, 2013.
"America's Largest Managed Security Services Provider Launches Comprehensive, Integrated Covid-19 Safety Program for Office Buildings and Suites," KastleSafeSpaces, 5 pages, May 11, 2020.
"An Overview of NiagraAX: A comprehensive software platform designed to create smart device applications," Tridium, Inc., 2005.
"Attune Advisory Services," press release, Honeywell International Inc., Mar. 20, 2012.
"BACnet Protocol Implementation Conformance Statement" for enteliWEB, Delta Controls, Jul. 17, 2013.
"Biometric Door Reader With Body Temperature Detection," Kintronics, 9 pages, accessed May 21, 2020.
"Body Surface Temperature Screening with Alarm Function TVS-200IS/TVS-500IS," Nippon Avionics Co., 3 pages, accessed May 21, 2020.
"BriefCam announces video analytics innovation for contact tracing, physical distancing, occupancy management and face mask detection," BriefCam LTD, 11 pages, Jun. 5, 2020.
"Building Automation Software Solutions," Iconics, 2013.
"Contact Tracing Now Available on Identiv's Hirsch Velocity Access Control Platform," Identiv, 5 pages, May 21, 2020.
"Creston Special Report: How Intelligent building management solutions are reducing operational costs," Creston, 2012.
"Data analytics and smart buildings increase comfort and energy efficiency", https://www.microsoft.com/itshowcase/Article/Content/845/Data-analytics-and-smart-buildings-increase-comfort-and-energy-efficiency, Dec. 19, 2016, 8 pages.
"Facial Attendace System With Temperature Screening Now in India," IANS, 5 pages, Mar. 19, 2020.
"FebriEye-AI Based Thermal Temperature Screening System," vehant, 1 page, 2020.
"How Smarter AI-Powered Cameras Can Mitigate the Spread of Wuhan Novel," AnyConnect, 22 pages, 2020.
"How to fight COVID-19 with machine learning," DataRevenue, 20 pages, accessed May 25, 2020.
"Inncontrol 5," Honeywell, 2 pages, Aug. 8, 2018.
"Intelligent Building Management Systems in Miami," Advanced Control Corp., Mar. 7, 2013.
"IP Door Access Control," Kintronics, 21 pages, 2014.
"Kogniz AI Health Response Platform," Kogniz, 9 pages, accessed May 21, 2020.
"Machine Learning Could Check If You're Social Distancing Properly at Work," MIT Technology Review, 7 pages, Apr. 17, 2020.
"NEC launches dual face biometric and fever detection system for access control," Biometric Update, 4 pages, May 8, 2020.
"NiagraAX Product Model Overview," Tridium, Inc., 2005.
"Phoenix Controls Portal," Phoenix Controls, Inc., 2013.
"Plan to Re-Open," Ehigh, 16 pages, accessed Jun. 13, 2020.
"Remote temperature monitoring," Axis Communication, 10 pages, 2014.
"See the World in a New Way Hikvision Thermal Cameras," Hikvision, 12 pages, 2017.
"The Ohio State University," BACnet International Journal, vol. 5, p. 4, Jan. 2013.
"Thermal Imaging SmartPhone Can Be used for Temperature Screening of People," CAT, 3 pages, accessed Jul. 13, 2020.
"WEBs-AX Web-Enabled Building Solutions," sales brochure, Honeywell International Inc., Mar. 2009.
http://www. docs. hvacpartners. com/idc/grou ps/public/documents/techlit/gs-controls-ivuccn.rtf, "Products," 5 pages, printed Jul. 3, 2007.
"4.0 Today's Activities, The Home Dashboard," CRBM info@hand website, 46 pages, prior to Apr. 25, 2013.
"Ashrae Dashboard Research Project," 2 pages, Aug. 28, 2008.
"Energy Manager User Guide," Release 3.2, Honeywell, 180 pages, 2008.
"Free Facilities Dashboards," eSight Energy Website, 2 pages, prior to Apr. 25, 2013.
"Fuzzy Logic Toolbox 2.1, Design and Stimulate Fuzzy Logic Systems," The MathWorks, 2 pages, May 2004.
"Junk Charts, Recycling Chartjunk as junk art," 3 pages, Oct. 2, 2006.
"Model Predictive Control Toolbox 2, Develop Internal Model-Based Controllers for Constrained Multivariable Processes," The MathWorks, 4 pages, Mar. 2005.
"Statistics Toolbox, for Use with Matlab," User's Guide Version2, The MathWorks, 408 pages, Jan. 1999.
"Vykon Energy Suite Student Guide," Tridium Inc., 307 pages, Mar. 3, 2006.
"Web Based Energy Information Systems for Energy Management and Demand Response in Commercial Buildings," California Energy Commission, 80 pages, Oct. 2003.
A Bold New Direction, "The Next Generation Global Integration Controller", 7 pages. (date not available).
ABB, "White Paper-Predictive Maintenance Goes Mainstream", Memphis, TN, 5 pages, 2020.
Ahn et al., "A Compact Printed Dual-Band WLAN Antenna with a Shorted Coupling Strip for Mobile Terminals." Proceedings of APMC 2012, Kaosiung, Taiwan, pp. 313-315, Dec. 4-7, 2012.
Alam et al., "A Dual-Band CPW-fed miniature planar antenna for S-, C-, WiMAX, WLAN, UWB and X-band applications," Scientific Reports, vol. 12: Article No. 7584, 16 pages, Published May 9, 2022.
Alerton Building Controls, Gallery Prints, 7 pages, Dec. 19, 2013.
Allain, "Trying out the iPhone Infrared Camera: The FLIR One," Wired, 15 pages, 2014.
Andover Controls World, 4 pages, Spring 1997.
Andover Controls, Network News, vol. 2, No. 2, 8 pages, 1997.
Ashrae Research for EMCS Dashboard, available online at: <https://www.taylor-engineering.com/dashboard/>, May 30, 2013, 2 pages.
Automated Buildings.com Press Release—New Products, BACnet Testing Laboratories, 9 pages, Nov. 2016.

* cited by examiner

DUAL BAND PRINTED F-ANTENNA USING A TRAP WITH SMALL BAND SEPARATION

RELATED APPLICATIONS

This application claims the benefit of U.S. Provisional Patent Application Ser. No. 63/481,724, filed Jan. 26, 2023, which application is incorporated by reference herein.

TECHNICAL FIELD

The present disclosure pertains to antennas that may be used in a variety of wireless applications and more particularly pertains to dual band antennas having a small frequency band separation.

BACKGROUND

A variety of electronic devices utilize antennas for wirelessly transmitting and/or receiving information. In some cases, it may be desirable for an electronic device to have the capability of communicating over two or more different frequency bands. What would be desirable is a dual band antenna that can be easily and inexpensively incorporated into a variety of different electronic devices to support communication over each of two different frequency bands.

SUMMARY

This disclosure pertains to generally antennas that may be used in a variety of wireless applications and more particularly pertains to dual band antennas having a small frequency band separation. An example may be found in a dual band inverted-F antenna. The illustrative dual band inverted-F antenna includes a ground plane formed by a first conductive layer of a Printed Circuit Board (PCB). A first antenna element is formed by the first conductive layer, the first antenna element having a first leg and a second leg, wherein the first leg is connected to the ground plane, and the second leg extends along a length from the first leg to a distal end of the second leg parallel to the ground plane. A second antenna element is formed by the first conductive layer, the second antenna element connected to the second leg of the first antenna element at a first connection point along the length of the second leg that is proximal of the distal end of the second leg, the second antenna element electrically coupled to an antenna signal trace of the PCB. A third antenna element is formed by the first conductive layer, the third antenna element is spaced from the second leg of the first antenna element by a gap and positioned along the length of the second leg proximal of the distal end of the second leg but distal of the first connection point. A trap is operatively coupled across the gap between the second leg of the first antenna element and the third antenna element.

Another example may be found in a dual band inverted-F antenna that includes a planar inverted-F antenna with a trap, and is configured to have a first frequency band and a second frequency band. The first frequency band is separated from the second frequency band by less than 100 MHz.

Another example may be found in a dual band inverted-F antenna. The dual band inverted-F antenna includes a planar inverted-F antenna with a trap, and is configured to have a first frequency band and a second frequency band. The first frequency band includes 865-870 MHz and the second frequency band includes 905-925 MHz.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which.

Figure 1:
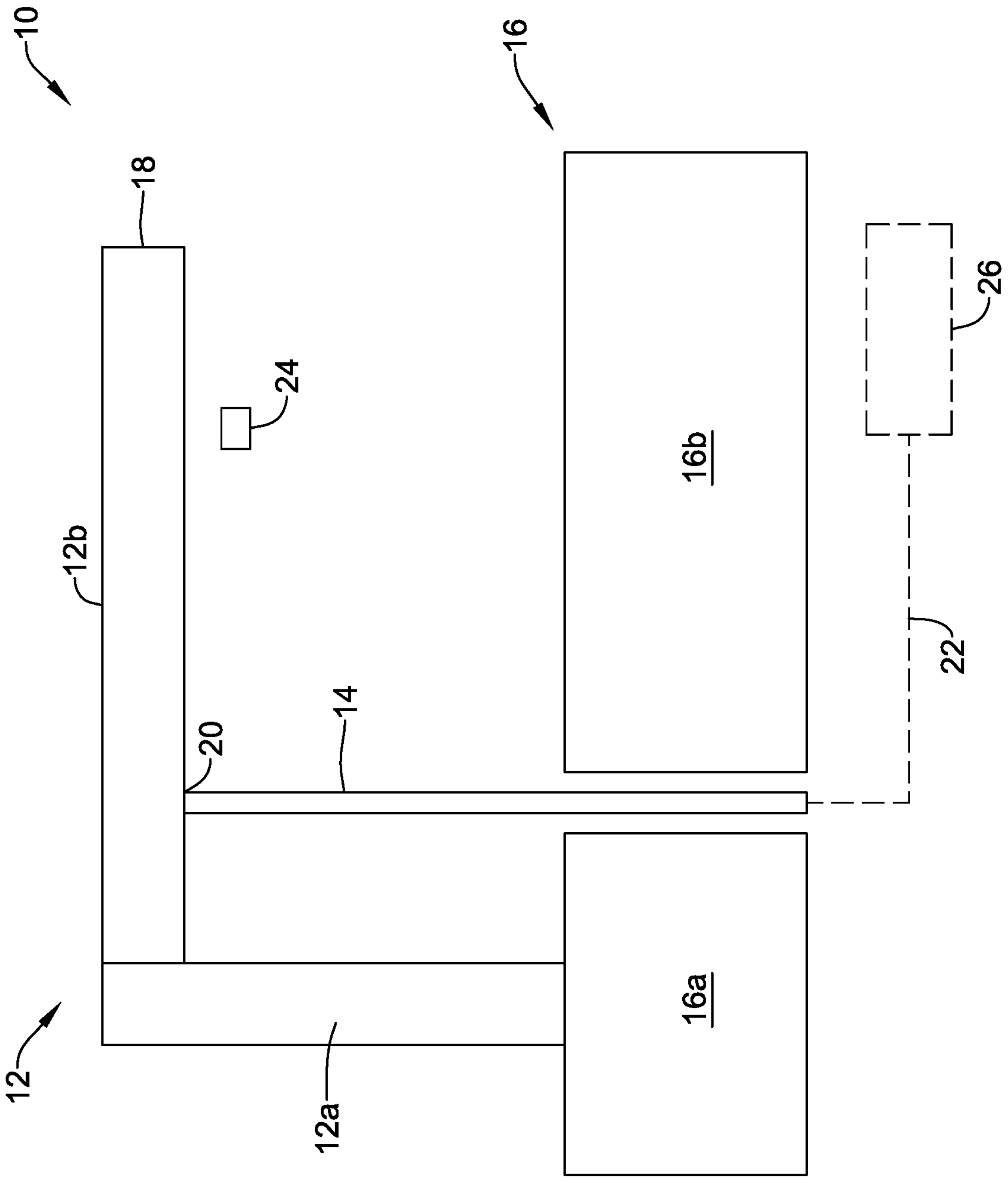
FIG. 1 is a schematic diagram showing an illustrative dual band inverted-F antenna.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The term "about" means within a range of plus or minus 10 percent of the expressed number. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

A dual band inverted-F antenna is described herein. The dual band inverted-F antenna may be a printed antenna, sometimes printed on a Printed Circuit Board (PCB). In some cases, the dual band inverted-F antenna may provide a first frequency band and a second frequency band, where the second frequency band is different from the first frequency band but is relatively close to the first frequency band (e.g. within 100 MHz). In some instances, the dual band inverted-F antenna may include a trap to help create the first and second frequency bands. As an example, the trap may include one or more capacitors and one or more inductors connected in parallel, and may act as a band stop (e.g. notch) filter. In one example, for a dual band inverted-F antenna having a first frequency band between 865 MHz and 870 MHz and a second frequency band between 902 MHz and 928 MHz, a capacitor having a capacitance of 9.1±0.05 pF (pico farads) and one or more inductors with a total effective inductance of 3.4 nH (nano henry) with a tolerance of ±2 percent may be used.

In some instances, the dual band inverted-F antenna may be designed to utilize the first frequency band when used in electronic devices in parts of the world that utilize the first frequency band, and to utilize the second frequency band when used in electronic devices in parts of the world that utilize the second frequency band. It is contemplated that the dual band inverted-F antenna may be used in an electronic device that is configured to utilize both frequency bands.

An example of a dual band inverted-F antenna includes a ground plane formed by one or more conductive layers of a Printed Circuit Board (PCB). In some cases, conductive layer(s) and insulative layer(s) of the PCB may have a total thickness of 1.6 millimeters. The PCB insulative layer(s) may be formed of, or otherwise include, FR4. FR4 is a fiberglass-reinforced epoxy laminate material, and is considered to be flame-retardant. FR-4 glass epoxy has a good strength to weight ratio.

In one example, a first antenna element is formed by a first conductive layer. The first antenna element has a first leg and a second leg, where the first leg is connected to the ground plane, and the second leg extends parallel to the ground plane along a length from the first leg to a distal end of the second leg. A second antenna element is formed by the first conductive layer and is connected to the second leg of the first antenna element at a first connection point along the length of the second leg. The first connection point is proximal of the distal end of the second leg. The second antenna element is electrically coupled to an antenna signal trace of the PCB. The first antenna element and the second antenna element collectively form an antenna that is configured to operate in the first frequency band (e.g. 902-928 MHz). A third antenna element is formed by the first conductive layer and is spaced from the second leg of the first antenna element by a gap. The third antenna element is positioned along the length of the second leg of the first antenna element proximal of the distal end of the second leg but distal of the first connection point. The third antenna element is configured (sized and shaped) to operate in a second frequency band (e.g. 865-870 MHz). The third antenna element is electrically connected to the second leg of the first antenna element through a trap, and thus electrically connected to the second antenna element and the antenna signal trace.

To help block electrical current of the first frequency in the second leg of the first antenna element from flowing across the gap to the third antenna element, the trap is operatively coupled across the gap between the second leg of the first antenna element and the third antenna element. The trap may be coupled to the second leg at a second connection point along the length of the second leg. The second connection point is proximal of the distal end of the second leg but distal of the first connection point.

In one example, the trap may include an inductor that is coupled between the second leg of the first antenna element and the third antenna element, and a capacitor that is coupled between the second leg of the first antenna element and the third antenna element in parallel with the inductor. In some instances, the second connection point is located proximal of the distal end of the second leg by a distance of at least 10 percent of the total length of the second leg. In some instances, the first connection point is located proximal of the distal end of the second leg by a distance of at least 50 percent of the total length of the second leg. In some cases, the inductor and the capacitor may be surface mount components that are positioned across the gap and soldered direct to the first antenna element and the third antenna element.

In some instances, the antenna signal trace may be operatively coupled to a dual band radio circuitry that is mounted to the PCB. In some instances, the antenna signal trace of the PCB may be operatively coupled to filter circuitry mounted to the PCB. In some instances, the antenna signal trace of the PCB may be operatively coupled to amplifier circuitry mounted to the PCB.

In some instances, the dual band inverted-F antenna may be sensitive in a first frequency band and a second frequency band, wherein the first frequency band is non-overlapping with the second frequency band. As an example, the first frequency band may include 865-870 MHz and the second frequency band may include 902-928 MHz. In some instances, the first frequency band may have a bandwidth of at least 5 MHz with a −10 dB return loss or less within the band, and the second frequency band may have a bandwidth of at least 20 MHz with a −10 dB return loss or less within the band. In some cases, the first frequency band may be separated from the second frequency band by less than 100 MHz.

FIG. 1 is a schematic diagram showing an illustrative dual band inverted-F antenna 10. The illustrative dual band inverted-F antenna 10 includes a first antenna element 12, a second antenna element 14 and a third antenna element 24. The first antenna element 12 includes a first leg 12*a* and a second leg 12*b*. The first leg 12*a* is connected to a ground plane 16 that, as seen, may be considered as being divided into a first ground plane section 16*a* and a second ground plane section 16*b*. The second leg 12*b* extends along a length from the first leg 12*a* to a distal end 18 of the second leg 12*b*. In this example, the second leg 12*b* extends parallel to the ground plane 16. The second antenna element 14 is connected to the second leg 12*b* at a first connection point 20 along the length of the second leg 12*b* that is proximal (e.g. to the left of in FIG. 1) of the distal end 18 of the second leg 12*b*. In this example, the ground plane 16, the first antenna element 12 and the second antenna element 14 are each formed by a first conductive layer of a Printed Circuit Board (PCB), although this is not required. The second antenna element 14 is electrically coupled to an antenna trace signal 22 of the PCB. In some instances, the antenna trace signal 22 may be considered as having an impedance that matches that of the dual band inverted-F antenna 10. This may help prevent signal reflections at the interface between the antenna trace signal 22 and the dual band inverted-F antenna 10, thereby improving the effective antenna efficiency.

The third antenna element 24 is spaced from the second leg 12*b* of the first antenna element 12 by a gap. The third antenna element 24 is positioned along the length of the second leg 12*b* of the first antenna element 12 proximal of the distal end 18 of the second leg 12*b* but distal of the first connection point 20. The third antenna element 24 is configured (sized and shaped) to operate in the second frequency band. The third antenna element is electrically connected to the second leg 12*b* of the first antenna element 12 via the trap, and thus to the second antenna element 14 and the antenna trace signal 22.

To help block electrical current of the first frequency in the second leg 12*b* of the first antenna element 12 from flowing to the third antenna element 24, the trap 28 (e.g. trap shown in FIG. 2) is operatively coupled across the gap between the second leg 12*b* of the first antenna element 12 at the third antenna element 24. The trap 28 may be coupled to the second leg 12*b* at a second connection point along the length of the second leg 12*b*. The second connection point is proximal of the distal end 18 of the second leg 12*b* but distal of the first connection point 20.

Figure 2:
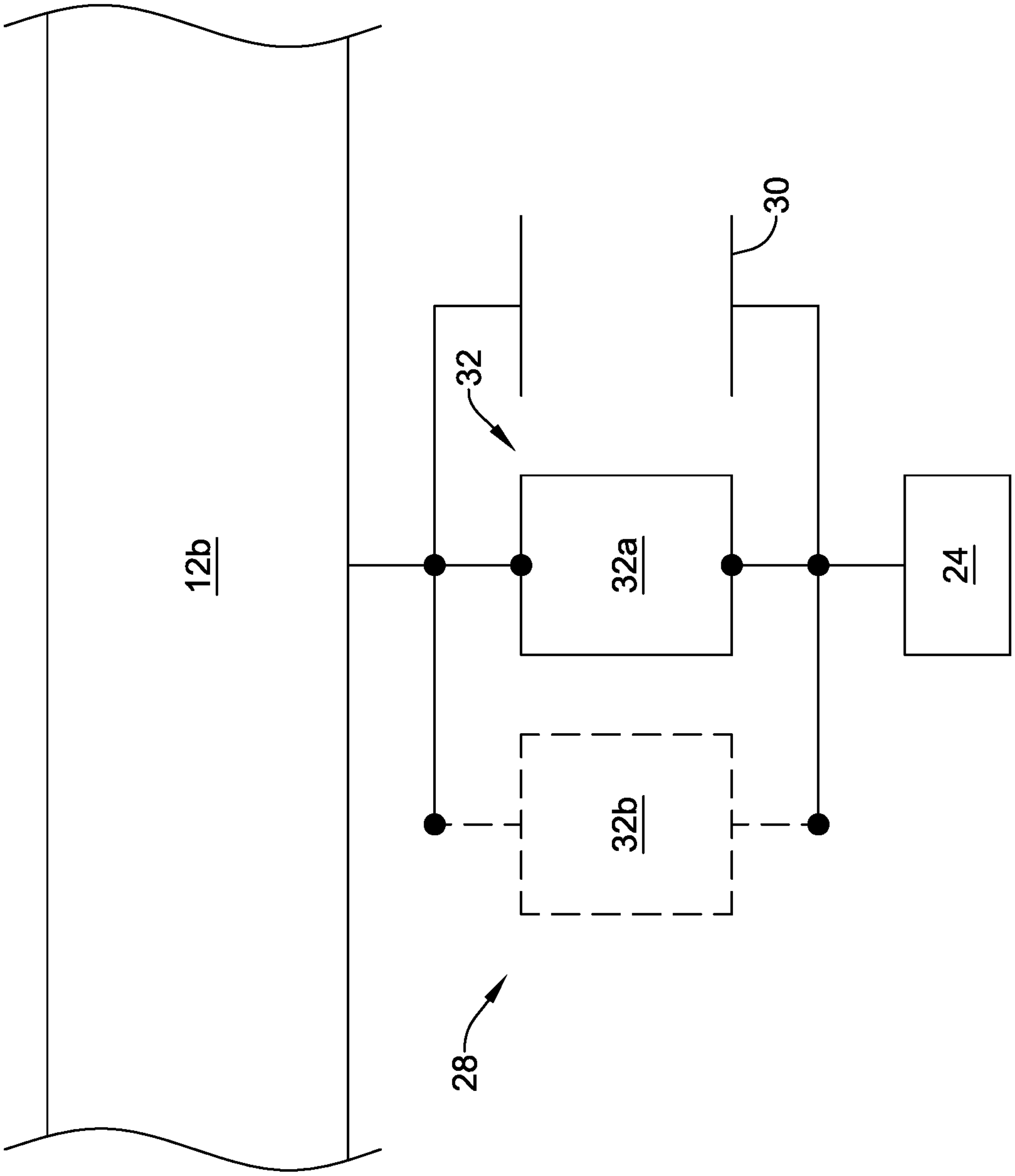
FIG. 2 is a schematic diagram showing an illustrative trap used as part of the illustrative dual band inverted-F antenna of FIG. 1.

In one example, and as shown in FIG. 2, the trap 28 may include an inductor 32*a* that is coupled between the second leg 12*b* of the first antenna element 12 and the third antenna element 24, and a capacitor 30 that is coupled between the second leg 12*b* of the first antenna element 12 and the third antenna element 24 in parallel with the inductor 32*a*. In some instances, a capacitor opposes a change in voltage and stores energy in the form of an electric field. In some instances, an inductor opposes a change in current and stores energy in the form of a magnetic field. In some instances, the second connection point is located proximal of the distal end 18 of the second leg 12*b* by a distance of at least 10 percent of the total length of the second leg 12*b*. In some instances, the first connection point 20 is located proximal of the distal end 18 of the second leg 12*b* by a distance of at least 50 percent of the total length of the second leg 12*b*. In some cases, the inductor 32*a* and the capacitor 30 may be surface mount components that are positioned across the gap and soldered direct to the second leg 12*b* of the first antenna element 12 and the third antenna element 24.

The illustrative dual band inverted-F antenna 10 may h be operatively coupled to an electrical component 26. In some cases, the electrical component 26 may be mounted onto the same PCB that the rest of the dual band inverted-F antenna 10 is formed from. In some instances, the electrical component 26 may be a radio. In some instances, the electrical component 26 may be a dual band radio. In some instances, the electrical component 26 may 26 may include filtering circuitry (e.g. bandpass filtering). In some instances, the electrical component 26 may include amplifier circuitry. In some instances, the electrical component 26 may include impedance-matching circuitry. These are just examples.

In some instances, the dual band inverted-F antenna 10 may be sensitive in a first frequency band and a second frequency band, wherein the first frequency band is non-overlapping with the second frequency band. As an example, the first frequency band may include 865-870 MHz and the second frequency band may include 902-928 MHz. In some cases, the first frequency band may have a bandwidth of at least 5 MHz with a −10 dB return loss or less within the band, and the second frequency band may have a bandwidth of at least 20 MHz with a −10 dB return loss or less within the band. In some cases, the first frequency band may be separated from the second frequency band by less than 100 MHz.

FIG. 2 is a schematic diagram showing an illustrative trap 28. The trap 28 may act as a band stop (e.g. notch) filter that has the effect of blocking first frequency electrical current in the second leg 12*b* of the first antenna element 12 from flowing to the third antenna element 24. The trap is operatively coupled across the gap between the second leg 12*b* of the first antenna element 12 at the third antenna element 24 (see FIG. 1). In the example shown, the trap 28 includes a capacitor 30 that is connected in parallel with an inductor 32. In some cases, a single inductor 32*a* may be used. In some cases, depending on the desired total inductance, a second inductor 32*b* may also be used in combination with the inductor 32*a*. In an example, the capacitor 30 may have a capacitance of 9.1±0.05 pF, the inductor 32*a* and the inductor 32*b* may each have an inductance of 6.8 nH±2 percent (for a total of 3.4 nH when connected in parallel as shown). This is just an example. In some cases, the inductor 32 and the capacitor 30 may be surface mount components that are positioned across the gap and soldered direct to the second leg 12*b* of the first antenna element 12 and the third antenna element 24.

By moving the third antenna element 24 and the trap 28 away from the distal end 18 of the second leg 12*b*, where the electromagnetic field of the antenna is largest, the overall sensitivity to the trap 28 is reduced. This allows the manufacturing tolerances of the capacitor and inductor values of the components 30,32 of the trap 28 to have a smaller influence, while still achieving the desired frequency response for the dual band inverted-F antenna 10. For example, since the manufacturing tolerances for the capacitor and inductor component 30,32 do not necessarily scale with the magnitude of the capacitance and/or inductance values, it can be desirable to use a capacitor component 30 in the trap 28 that has a larger capacitance value so that the ±manufacturing tolerances of the capacitor component 30 have an overall smaller effect on the filter characteristics of the trap 28. Use of a larger capacitance value is possible because the overall sensitivity of the trap 28 is reduced when moving the third antenna element 24 and the trap 28 away from the distal end 18 of the second leg 12*b*. Likewise, in some cases, multiple larger inductor components 32*a* and 32*b* may be provided in a parallel configuration (as shown in FIG. 2) to achieve a desired inductance value so that the ±manufacturing tolerances of the inductor components 32*a* 32*b* have an overall smaller effect on the filter characteristics of the trap 28. This may help reduce changes in the first and second frequency bands due to manufacturing tolerances of the trap components, which can be important particular where the frequency bands are relatively close to each other, such as within less than 100 MHz of each other.

Figure 3:
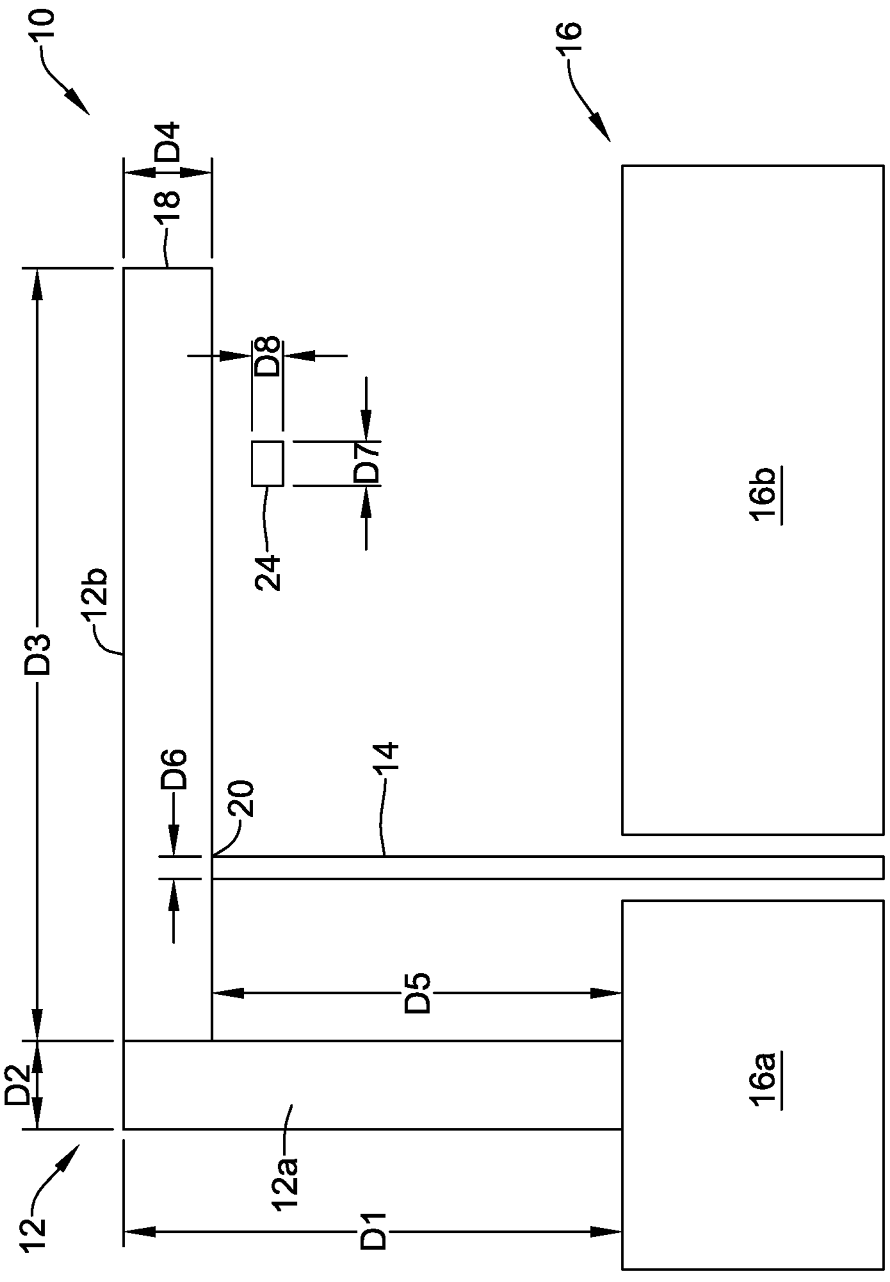
FIG. 3 is a schematic diagram showing the illustrative dual band inverted-F antenna of FIG. 1, with various dimensions annotated.

FIG. 3 is a schematic diagram of the dual band inverted-F antenna 10, showing various dimensions of the dual band inverted-F antenna 10. The first leg 12*a* may have a length D1 in a range of about 10 to 15 millimeters and a width D2 that is in a range of about 2 to 3 millimeters. The second leg 12*b* has a length D3 in a range of about 50 to 60 millimeters and a width D4 that is in a range of about 2 to 3 millimeters. The second antenna element 14 has a length D5 (between the second leg 12*b* and the ground plane 16) that is in a range of about 8 to 12 millimeters and a width D6 that is in a range of about 0.5 to 1 millimeter. The conductive pad of the third antenna element 24 has a length D7 that is in a range of about 3 to 4 millimeters and a width D8 that is in a range of about 1 to 2 millimeters.

Figure 4:
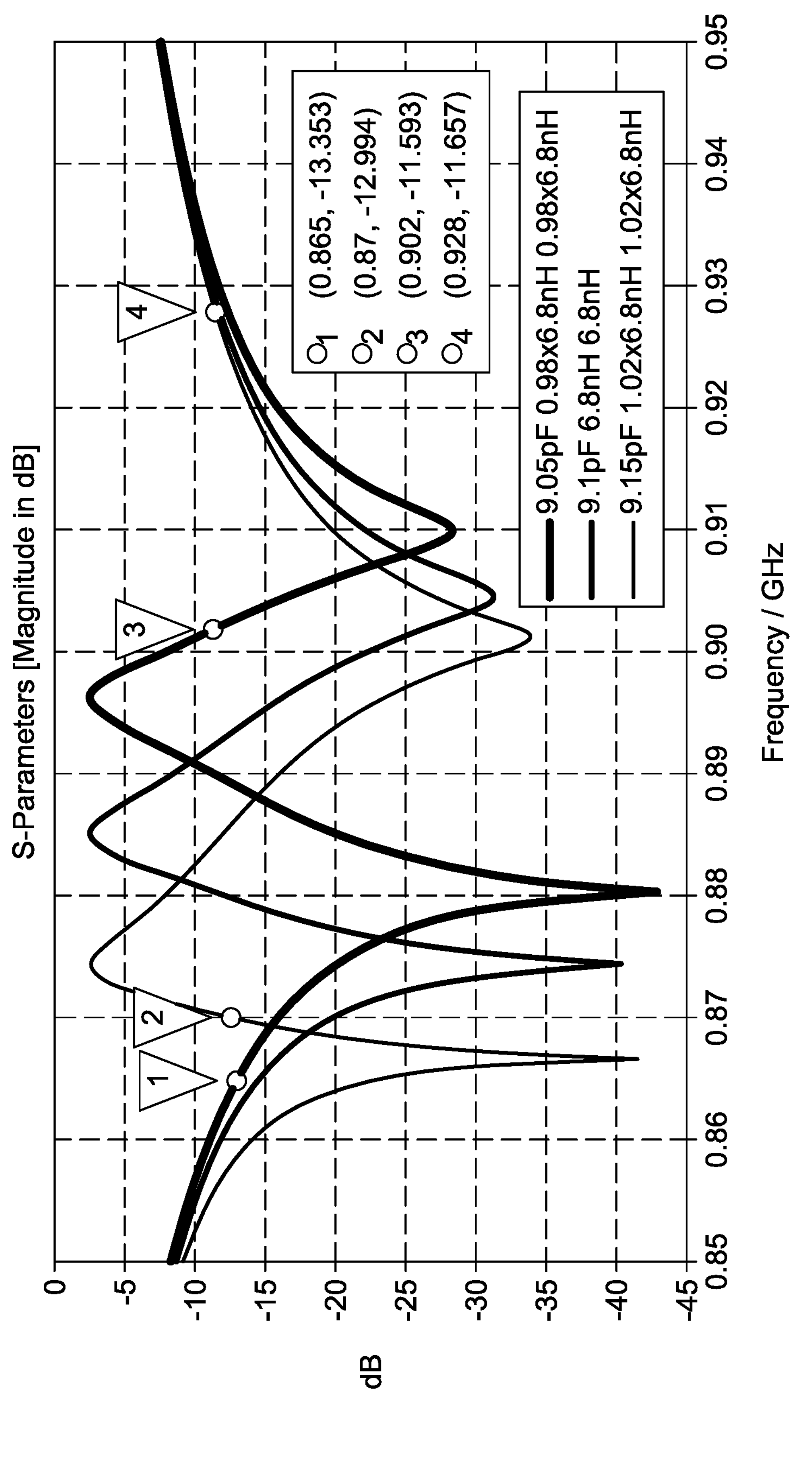
FIG. 4 is a graphical representation of a simulated frequency response for the inverted-F antenna of FIGS. 1-3.

FIG. 4 is a graphical representation of a simulated frequency response for the inverted-F antenna of FIGS. 1-3. More particularly, FIG. 4 shows a plot of magnitude in decibels (dB) versus frequency in gigahertz (GHz) for a dual band inverted-F antenna such as the dual band inverted-F antenna 10. The simulated antenna had a ground plane that was 100 millimeters by 100 millimeters PEC, with a thickness of 1.6 millimeters. The antenna area was 13.5 millimeters wide. Antenna dimensions were 59.4 millimeters by 11 millimeters, antenna trace (D2 and D4) was 2.6 millimeters wide and the feed width (D6) was 0.65 millimeters. Antenna PEC thickness was 0.035 millimeters. FIG. 4 shows antenna return loss with the trap 28 including a 9.1 pF capacitor (nominal) and a pair of inductors each having an inductance of 6.8 nH (nominal). FIG. 4 also shows return loss versus frequency for the two ends of tolerance, including a 9.05 pF capacitor and a pair of 6.664 nH inductors (98% of 6.8 nH), and a 9.15 pF capacitor and a pair of 6.936 nH inductors. As can be seen, across all tolerances of the capacitor and the inductors of the trap 28, a design goal of having a return less of less than −10 dB in both the first frequency band of 865-870 MHz (noted between arrows "1" and "2" in FIG. 4) and the second frequency band of 902-928 MHz (noted between arrows "3" and "4" in FIG. 4).

It should be understood that this disclosure is, in many respects, only illustrative. Changes may be made in details, particularly in matters of shape, size, and arrangement of steps without exceeding the scope of the disclosure. This may include, to the extent that it is appropriate, the use of any of the features of one example embodiment being used in other embodiments.

What is claimed is:

1. A dual band inverted-F antenna, comprising:

a ground plane formed by a first conductive layer of a Printed Circuit Board (PCB);

a first antenna element formed by the first conductive layer, the first antenna element having a first leg and a second leg, wherein the first leg is connected to the ground plane, and the second leg extends along a length from the first leg to a distal end of the second leg parallel to the ground plane;

a second antenna element formed by the first conductive layer, the second antenna element connected to the second leg of the first antenna element at a first connection point along the length of the second leg that is proximal of the distal end of the second leg, the second antenna element electrically coupled to an antenna signal trace of the PCB;

a third antenna element formed by the first conductive layer, the third antenna element is spaced from the second leg of the first antenna element by a gap and positioned along the length of the second leg proximal of the distal end of the second leg but distal of the first connection point; and a trap operatively coupled across the gap between the second leg of the first antenna element and the third antenna element.

2. The dual band inverted-F antenna of claim 1, wherein the trap comprises:

an inductor coupled between the second leg of the first antenna element and the third antenna element; and a capacitor coupled between the second leg of the first antenna element and the third antenna element in parallel with the inductor.

3. The dual band inverted-F antenna of claim 1, wherein the third antenna element is proximal of the distal end of the second leg by a distance of at least 10 percent of the length of the second leg.

4. The dual band inverted-F antenna of claim 3, wherein the first connection point is proximal of the distal end of the second leg by a distance of at least 50 percent of the length of the second leg.

5. The dual band inverted-F antenna of claim 1, wherein the antenna signal trace of the PCB is operatively coupled to a dual band radio that is mounted to the PCB.

6. The dual band inverted-F antenna of claim 1, wherein the antenna signal trace of the PCB is operatively coupled to filter circuitry mounted to the PCB.

7. The dual band inverted-F antenna of claim 1, wherein the antenna signal trace of the PCB is operatively coupled to amplifier circuitry mounted to the PCB.

8. The dual band inverted-F antenna of claim 1, wherein the dual band inverted-F antenna is sensitive in a first frequency band and a second frequency band, wherein the first frequency band is non-overlapping with the second frequency band.

9. The dual band inverted-F antenna of claim 8, wherein the first frequency band includes 865-870 MHz and the second frequency band includes 902-928 MHz.

10. The dual band inverted-F antenna of claim 9, wherein the first frequency band has a bandwidth of at least 5 MHz with a −10 dB return loss or less within the band, and the second frequency band has a bandwidth of at least 20 MHz with a −10 dB return loss or less within the band.

11. The dual band inverted-F antenna of claim 8, wherein the first frequency band is separated from the second frequency band by less than 100 MHz.

12. A dual band inverted-F antenna comprising:

a planar inverted-F antenna; and a trap configured to provide the antenna with both a first frequency band and a second frequency band;

wherein the first frequency band is separated from the second frequency band by less than 100 MHz; and wherein the planar inverted-F antenna comprises:

a first antenna element;

a second antenna element connected to the first antenna element at a first connection point along the length of the first antenna element that is proximal of a distal end of the first antenna element, the second antenna element is electrically coupled to an antenna signal trace;

a third antenna element spaced from the first antenna element by a gap, the third antenna element positioned along the length of the first antenna element proximal of the distal end of the first antenna element but distal of the first connection point; and a trap operatively coupled across the gap between the first antenna element and the third antenna element, wherein the trap includes at least one capacitor and at least one inductor.

13. The dual band inverted-F antenna of claim 12, wherein the first frequency band includes 865-870 MHz and the second frequency band includes 902-928 MHz.

14. The dual band inverted-F antenna of claim 12, wherein the trap is proximal of the distal end of the first antenna element.

15. The dual band inverted-F antenna of claim 14, wherein the trap is positioned proximal of the distal end of the first antenna element by a distance of at least 10 percent of a distance between the distal end of the first antenna element and the first connection point.

16. A dual band inverted-F antenna comprising:

a planar inverted-F antenna; and a trap configured to provide the antenna with both a first frequency band and a second frequency band; and the first frequency band includes 865-870 MHz and the second frequency band includes 905-925 MHz; wherein the planar inverted-F antenna comprises:

a first antenna element;

a second antenna element connected to the first antenna element at a first connection point along the length of the first antenna element that is proximal of a distal end of the first antenna element, the second antenna element is electrically coupled to an antenna signal trace;

a third antenna element spaced from the first antenna element by a gap, the third antenna element positioned along the length of the first antenna element proximal of the distal end of the first antenna element but distal of the first connection point; and a trap operatively coupled across the gap between the first antenna element and the third antenna element, wherein the trap includes at least one capacitor and at least one inductor.

17. The dual band inverted-F antenna of claim 16, wherein the trap is proximal of the distal end of the first antenna element.

18. The dual band inverted-F antenna of claim 17, wherein the trap is positioned proximal of the distal end of the first antenna element by a distance of at least 10 percent of a distance between the distal end of the first antenna element and the first connection point.

* * * * *